(12) United States Patent
Siddiqui et al.

(10) Patent No.: US 10,848,397 B1
(45) Date of Patent: *Nov. 24, 2020

(54) SYSTEM AND METHOD FOR ENFORCING COMPLIANCE WITH SUBSCRIPTION REQUIREMENTS FOR CYBER-ATTACK DETECTION SERVICE

(71) Applicant: FireEye, Inc., Milpitas, CA (US)

(72) Inventors: Mumtaz Siddiqui, Fremont, CA (US); Manju Radhakrishnan, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,621

(22) Filed: Sep. 29, 2017

Related U.S. Application Data

(60) Provisional application No. 62/479,208, filed on Mar. 30, 2017, provisional application No. 62/523,121, (Continued)

(51) Int. Cl.
*G06F 12/16* (2006.01)
*H04L 12/24* (2006.01)
(Continued)

(52) U.S. Cl.
CPC ........ *H04L 41/5067* (2013.01); *G06F 21/552* (2013.01); *G06F 21/56* (2013.01); (Continued)

(58) Field of Classification Search
USPC ........................................................ 726/24
See application file for complete search history.

(56) References Cited

U.S. PATENT DOCUMENTS 4,292,580 A    9/1981   Ott et al.
5,175,732 A   12/1992   Hendel et al.
(Continued)

FOREIGN PATENT DOCUMENTS

GB    2439806 A    1/2008
GB    2490431 A   10/2012
(Continued)

OTHER PUBLICATIONS

Thomas H. Ptacek, and Timothy N. Newsham, "Insertion, Evasion, and Denial of Service: Eluding Network Intrusion Detection", Secure Networks, ("Ptacek"), (Jan. 1998).
(Continued)

*Primary Examiner* — Amare F Tabor
(74) *Attorney, Agent, or Firm* — Rutan & Tucker, LLP

(57) ABSTRACT

A system featuring a cloud-based malware detection system for analyzing an object to determine whether the object is associated with a cyber-attack. Herein, subscription review service comprises a data store storing subscription information. The subscription information includes identifier for the customer and one or more identifiers each associated with a corresponding customer submitter operable to submit an object to the cloud-based malware detection system for analysis. The first customer submitter receives credentials provided by the subscription review service to establish communications with the cloud-based malware detection system. The first customer submitter includes a first submitter identifier that comprises (i) enforcement logic that enforces compliance with a plurality of requirements of the subscription to the cloud-based malware detection system and (ii) reporting logic that transmits a result of the analysis of the object by the cloud-based malware detection system in determining whether the object is associated with a cyber-attack.

45 Claims, 9 Drawing Sheets

Related U.S. Application Data filed on Jun. 21, 2017, provisional application No. 62/523,123, filed on Jun. 21, 2017.

(51) Int. Cl.

| | | |
|---|---|---|
| *G06F 21/55* | (2013.01) | |
| *G06F 21/56* | (2013.01) | |
| *H04L 29/06* | (2006.01) | |
| *H04L 29/08* | (2006.01) | |
| *G06Q 30/02* | (2012.01) | |
| *G06F 21/57* | (2013.01) | |

(52) U.S. Cl.

CPC ...... *H04L 63/1408* (2013.01); *H04L 63/1433* (2013.01); *H04L 67/025* (2013.01); *H04L 67/10* (2013.01); *H04L 67/12* (2013.01); *G06F 21/57* (2013.01); *G06Q 30/0201* (2013.01)

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,984,503 B2 * | 7/2011 | Edwards ............... G06F 21/57 713/188 |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |

(56) References Cited

U.S. PATENT DOCUMENTS

| | | |
|---|---|---|
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,413,209 B2 | 4/2013 | Aldera et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,549,645 B2 | 10/2013 | Tang et al. |
| 8,555,391 B1 | 10/2013 | Demir et al. |
| 8,555,392 B2 * | 10/2013 | Golovkin ............ H04L 63/1408 726/24 |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,578,491 B2 * | 11/2013 | McNamee .......... H04L 63/1408 709/223 |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,683,593 B2 * | 3/2014 | Mahaffey .............. G06F 21/564 709/203 |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,763,127 B2 * | 6/2014 | Yao ....................... G06F 21/316 726/24 |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,027,138 B2 * | 5/2015 | Glenn .................. G06F 21/552 726/24 |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,344,447 B2 | 5/2016 | Cohen et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,374,381 B2 * | 6/2016 | Kim .................. H04L 63/1416 |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,450,840 B2 | 9/2016 | Denis |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,054 B2 * | 12/2016 | Malachi ................ H04L 63/145 |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |

(56) References Cited

U.S. PATENT DOCUMENTS

| | | |
|---|---|---|
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,832,216 B2 * | 11/2017 | Kaloroumakis ....... G06N 7/005 |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,284,574 B1 | 5/2019 | Aziz et al. |
| 10,284,575 B2 | 5/2019 | Paithane et al. |
| 10,335,738 B1 | 7/2019 | Paithane et al. |
| 10,341,363 B1 | 7/2019 | Vincent et al. |
| 10,366,231 B1 | 7/2019 | Singh et al. |
| 10,432,649 B1 | 10/2019 | Bennett et al. |
| 10,454,953 B1 | 10/2019 | Amin et al. |
| 10,467,414 B1 | 11/2019 | Kindlund et al. |
| 10,469,512 B1 | 11/2019 | Ismael |
| 10,476,906 B1 | 11/2019 | Siddiqui |
| 10,476,909 B1 | 11/2019 | Aziz et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,534,906 B1 | 1/2020 | Paithane et al. |
| 10,554,507 B1 | 2/2020 | Siddiqui et al. |
| 10,581,898 B1 | 3/2020 | Singh |
| 10,601,863 B1 | 3/2020 | Siddiqui |
| 10,616,266 B1 | 4/2020 | Otvagin |
| 10,623,434 B1 | 4/2020 | Aziz et al. |
| 10,637,880 B1 | 4/2020 | Islam et al. |
| 10,657,251 B1 | 5/2020 | Malik et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |

(56) References Cited

U.S. PATENT DOCUMENTS

| | | |
|---|---|---|
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320562 A1 | 12/2008 | Creamer et al. |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |

(56) References Cited

U.S. PATENT DOCUMENTS

| | | |
|---|---|---|
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074143 A1 | 3/2013 | Bu et al. |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0232576 A1* | 9/2013 | Karnikis ............ G06F 21/56 726/24 |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0036855 A1 | 2/2016 | Gangadharappa et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0197951 A1 | 7/2016 | Lietz et al. |
| 2016/0261612 A1 | 9/2016 | Mesdaq et al. |
| 2016/0285914 A1 | 9/2016 | Singh et al. |
| 2016/0301703 A1 | 10/2016 | Aziz |

(56) References Cited

U.S. PATENT DOCUMENTS

| | | | |
|---|---|---|---|
| 2016/0335110 | A1 | 11/2016 | Paithane et al. |
| 2017/0083703 | A1 | 3/2017 | Abbasi et al. |
| 2017/0300693 | A1 | 10/2017 | Zhang et al. |
| 2017/0329968 | A1* | 11/2017 | Wachdorf ............ G06F 21/564 |
| 2018/0013770 | A1 | 1/2018 | Ismael |
| 2018/0048660 | A1 | 2/2018 | Paithane et al. |
| 2018/0063177 | A1* | 3/2018 | Yamada ............. H04L 63/1416 |
| 2018/0121316 | A1 | 5/2018 | Ismael et al. |
| 2018/0219891 | A1* | 8/2018 | Jain ...................... H04L 63/1433 |
| 2018/0288077 | A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.jsp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

(56) References Cited

OTHER PUBLICATIONS

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

PCT/US2018/025329 filed Mar. 30, 2018 International Search Report and Written Opinion dated Jun. 20, 2018.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

PCT/US2018/025329 filed Mar. 30, 2018 International Preliminary Report on Patentability dated Oct. 1, 2019.

U.S. Appl. No. 15/721,630, filed Sep. 29, 2017 Notice of Allowance dated May 23, 2019.

U.S. Appl. No. 15/940,307, filed Mar. 29, 2018 Non-Final Office Action dated Jan. 10, 2020.

U.S. Appl. No. 15/940,352, filed Mar. 29, 2018 Non-Final Office Action dated Dec. 12, 2019.

U.S. Appl. No. 15/940,410, filed Mar. 29, 2018 Non-Final Office Action dated Feb. 3, 2020.

U.S. Appl. No. 15/940,307, filed Mar. 29, 2018 Notice of Allowance dated May 14, 2020.

U.S. Appl. No. 15/940,410, filed Mar. 29, 2018 Notice of Allowance dated May 15, 2020.

\* cited by examiner

US 10,848,397 B1

SYSTEM AND METHOD FOR ENFORCING COMPLIANCE WITH SUBSCRIPTION REQUIREMENTS FOR CYBER-ATTACK DETECTION SERVICE

FIELD

Embodiments of the disclosure relate to the field of cybersecurity; and more specifically to a subscription-based malware detection system.

GENERAL BACKGROUND

Cybersecurity attacks have become a pervasive problem for organizations as many networked devices and other resources have been subjected to attack and compromised. A cyber-attack constitutes a threat to security arising out of stored or in-transit data that may involve the infiltration of any type of software for example, onto a network device with the intent to perpetrate malicious or criminal activity or even a nation-state attack (i.e., "malware").

Recently, malware detection has undertaken many approaches involving network-based, malware protection services. One approach involves "on-site" placement of dedicated malware detection appliances at various ingress points throughout a network or subnetwork. Each of the malware detection appliances is configured to extract information propagating over the network at an ingress point, analyze the information to determine a level of suspiciousness, and conduct an analysis of the suspicious information internally within the appliance itself. While successful in detecting advanced malware that is attempting to infect network devices connected to the network (or subnetwork), as network traffic increases, an appliance-based approach may exhibit a decrease in performance due to resource constraints.

In particular, a malware detection appliance has a prescribed (and finite) amount of resources (for example, processing power) that, as resource capacity is exceeded, requires either the malware detection appliance to resort to more selective traffic inspection or additional malware detection appliances to be installed. The installation of additional malware detection appliances requires a large outlay of capital and network downtime, as information technology (IT) personnel are needed for installation of these appliances. Also, dedicated, malware detection appliances provide limited scalability and flexibility in deployment.

An improved approach that provides scalability, reliability, and efficient and efficacious malware detection at lower capital outlay is desirable.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
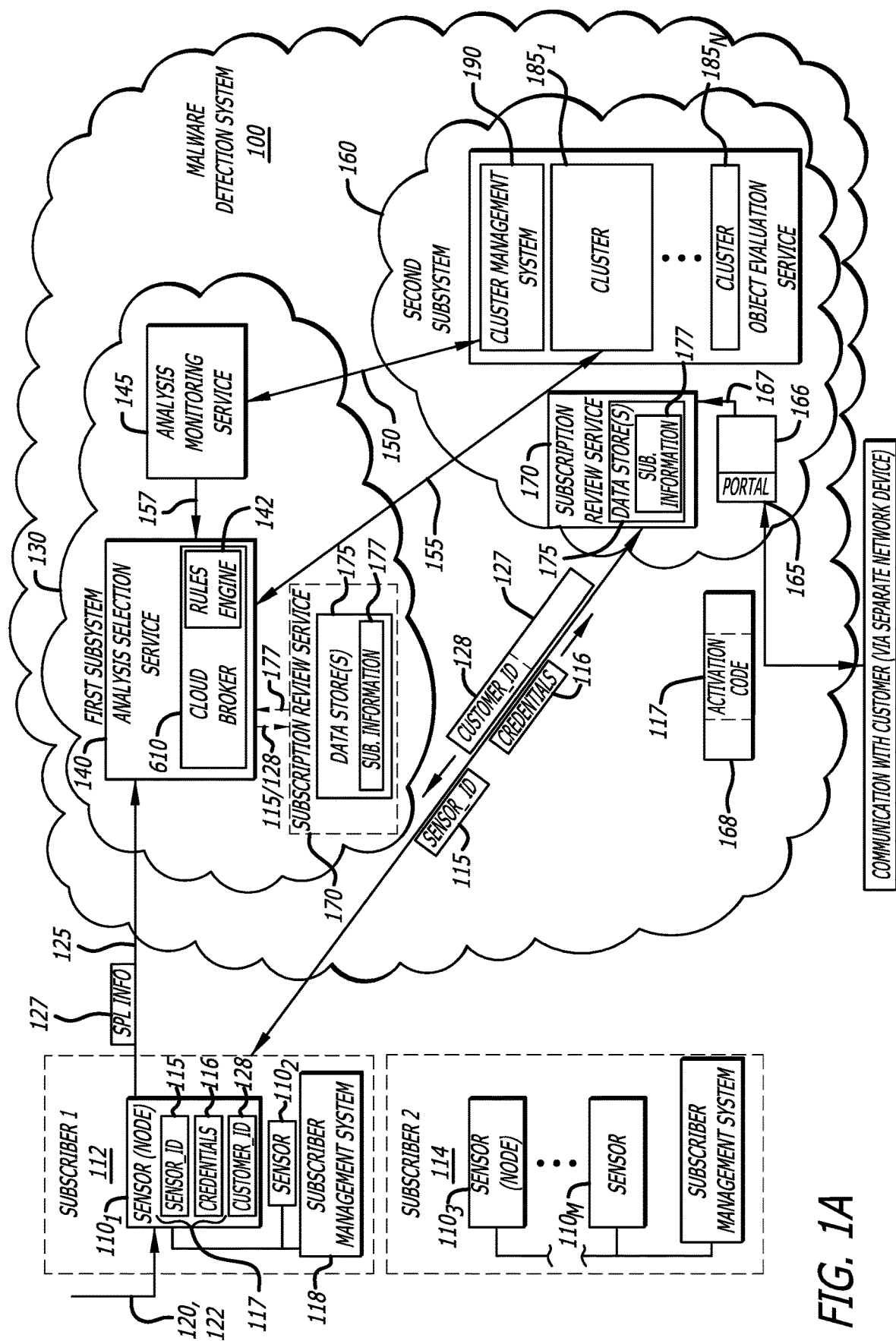
FIG. 1A is a block diagram of an exemplary embodiment of a scalable, malware detection system operating to establish a communication session extending from a sensor to a selected cluster.

Embodiments of the present disclosure generally relate to a subscription-based malware detection system, which includes a first subsystem and a second subsystem remotely located from the first subsystem. Herein, the first subsystem may provide multi-tenancy through a cloud-based service that connects any number of potential or actual customers (generally referred to as "customers") to an object evaluation service, hosted by the second subsystem, to analyze objects submitted by different customers to determine whether a cyber-attack has been conducted or is in process. This determination may be conducted by performing an analysis of the objects for an association with a cyber-attack. The malware detection system provides a flexible and efficient business model with differentiated service levels based on assigned or customer configured attributes for a subscription, which represent the customer's subscription requirements. The subscription requirements dictate a level of operation that the malware detection system must meet for the customer, and limits on what the customer may submit to the malware detection system for analysis. The object evaluation service can offer customers customized pricing based on, for example, different submission throughputs (data rates), different analysis criteria (e.g., analysis location or type), different remediation settings, different alert settings, and other features specified by these attributes.

More specifically, the first subsystem may be provided access to a plurality of attributes (generally referred to as "service attributes"), which may be maintained as structured data on a per-sensor, per-customer or per-group basis. The structured data is generally referred to as "subscription information." According to one embodiment of the disclosure, the service attributes include subscription attributes associated with an associated subscription tier, and customer-configurable attributes including guest image software attributes (types/versions for use in a virtual machine "VM" based dynamic analysis), and/or geographical attributes (analysis location).

As noted, the subscription attributes may be automatically selected based on the subscription tier chosen by the customer and appropriate payment. Each of these attributes may be assigned a value that specifies, for example, a level of performance including a predetermined (e.g., maximum) number or maximum rate of submissions for analysis over a prescribed period of time (e.g. per day, week or month), maximum response time in analysis of submissions, the customer size (e.g., number of endpoints protected through the malware detection system, maximum number of sensors supported by the malware detection system), or the like. It is contemplated that one of the subscription tiers offered may include a premium service tier which, if purchased, has a premium attribute set to assure priority service to reduce potential latency in the event of resource contention with other customers or sensor(s) for object analysis.

Each subscription tier may also permit differentiated services through customer-configurable attributes. The customer-configured attributes allow customers to tailor their subscriptions accordingly to current need. For example, a Korea-based company is able to select properties and functionality that may differ from U.S. based companies, resulting in different values for the same attribute types (e.g., selection of Korean-language word processor applications included in special guest images in VM based analysis at the object evaluation service instead of selecting only U.S. centric word processor applications). Also, the factory or a reseller/OEM may set certain "base attributes" that apply to all customers, and other attributes may be operationally dynamic as described elsewhere in the specification.

According to one embodiment of the disclosure, customer-specific controls of the malware detection system and its object evaluation service may be achieved based on a first level of control performed by enforcement logic within the first subsystem or a second level of control performed by enforcement logic at the subscriber site, or both. More specifically, the first subsystem of the malware detection system features (i) an analysis selection service and (ii) an analysis monitoring service. The analysis selection service includes logic, referred to as a "cloud broker," which is responsible for performing the first level of control by (a) selecting a cluster of the malware detection system to analyze objects that are submitted by a customer via a sensor; (b) monitoring operability of the selected cluster based on received operational metadata (described below); (c) enforcing compliance by the selected cluster to customer requirements for a subscription selected by the customer and by the customer (and its sensor(s)) to the subscription requirements; and/or (d) report compliance discrepancies, operational metadata and/or analysis results. Herein, the malware detection system employs a scalable architecture that includes one or more (and preferably plural) clusters, where each cluster includes at least one compute node to perform object evaluation for malware. The architecture renders the malware detection system scalable to allow additional clusters or compute nodes, or both, to be added as increased object analysis capacity is needed, as well as flexibility in operation, as will be described below. Additionally, this architecture provides assured continued availability of the malware detection service when a cluster or a compute node requires maintenance or is otherwise unavailable for malware detection. A "compute node" includes logic that is configured to analyze suspicious objects, where these objects may be detected by one or more sensors deployed at a subscriber site and, according to one embodiment, received via the first subsystem before being provided to the second subsystem for evaluation.

According to one embodiment, the subscription requirements as applied to cluster operability may be represented by a first set of attributes within the subscription information that pertain to a plurality of requirements (e.g., guaranteed system performance, geographic location requirements, software profile types, etc.) set for that customer's subscription. The subscription requirements as applied to customer usage of the malware detection system may be represented by a second set of service attributes, and the subscription requirements as applied to a particular sensor may be represented by a third set of service attributes. Each of these sets of service attributes may be mutually exclusive with the other and/or may intersect by sharing at least one attribute with the other set(s). Herein, the service attributes are a superset of (i) subscription attributes, (ii) customer-configured attributes, and (iii) operational attributes (described below), where the service attributes may include bandwidth attributes e.g., (maximum or minimum data rates, quality of service (QoS) thresholds, maximum rate (number of object submissions for analysis per prescribed time period), or the like).

Besides subscription enforcement, the cluster selection may be based, at least in part, on analyses of attributes from the subscription information and operational metadata directed, at least in part, to the workload, health, or availability of clusters. The "subscription information" may include the following: (i) subscription attributes (e.g., bandwidth attributes such as allocated minimum or maximum number or rate of object submissions per selected time period, QoS attributes (thresholds) guaranteed for a selected subscription tier, cluster availability attributes that are based on subscription tier and/or geographic location of subscriber site, etc.); (ii) customer-configured attributes as set by the customer (e.g., language, geographic location permissions or restrictions for cluster/compute nodes, remediation type set by the customer, notification "alert" type directed to customer-selected network device(s), virtual machine provisioning preferences that may range from high level granularity (e.g., email, web traffic, etc.) to lower level granularity (e.g., type of software profile required for analytic compute nodes including the type of operating system, application, and/or plug-in); (iii) factory set attributes (e.g., selected default cluster, selected default permissions, etc.); and/or (iv) operationally dynamic attributes (e.g., heuristics, communication history, etc.).

The analysis monitoring service includes logic, referred to as "system monitoring logic," which is configured to communicate with a cluster management system to receive the operational metadata, which may include metadata associated with one or more clusters (referred to as "cluster(s)") operating as part of the second subsystem and/or metadata associated with compute nodes within the cluster(s). The received metadata (e.g., capacity, rate of analyses, number of analyses conducted, guest images utilized, history regarding the foregoing as well as uptime and maintenance, etc.) may also be used to generate heuristic-based (operational) attributes associated with a cluster or compute nodes within the cluster.

According to one embodiment of the disclosure, the second subsystem of the malware detection system may include a portal, a subscription review service, and the object evaluation service. The portal provides a customer with access to at least one website hosted by a (portal) server deployed within the second subsystem. Of course, as alternative embodiments, the portal server may be deployed in the first subsystem or may be remotely located from either of the first or second subsystems. For these embodiments, the portal server is in communications with logic of the subscription review service.

Using the portal, via a network device (e.g., subscriber management system, endpoint device, etc.), a customer is able to register (subscribe) for services offered by the malware detection system. In so doing, the customer can use the portal to select a subscription tier to set a service performance level (i.e., subscription requirements as represented by service attributes and the values thereof) for the customer and/or service performance level for specific sensors. Later, using the portal, the customer is able to modify a current subscription (e.g., change subscription tier, increase/decrease number of authorized sensors, change customer-configured attributes on a customer or sensor basis, etc.). As an illustrative example, the portal provides the customer with access to one or more webpages (e.g., subscription webpages) that allows the customer to provide customer details, select a subscription tier, and select certain configurable attributes (i.e., customer-configured attributes). Collectively, the information loaded via the portal is referred to as "registration information," which is part of the subscription information.

Upon completing registration via the portal, an activation code may be sent by the portal server to a network device chosen by the customer or the network device used in the registration process. The activation code includes at least credentials that, when installed into a sensor of the customer, enables the sensor to communicate with the subscription review service for licensing and enrollment purposes.

Being part of the first subsystem or the second subsystem (as shown in FIG. 1A), the subscription review service is communicatively coupled to the portal server to receive the registration information for a particular customer for storage as part of its subscription information. According to one embodiment of the disclosure, the subscription review service may respond to a license request message from a sensor of the particular customer by returning information that enables the sensor to communicate with the cloud broker of the first subsystem (referred to as "service policy level information"). The system policy level information may include data maintained by the subscription information. Alternatively, in accordance with other embodiments directed to licensing and enrollment, the license request message may be provided to the subscription review service from a network device via the portal or via the subscriber management system on behalf of a customer (and its sensors), where the service policy level information may be directly or indirectly provided to the sensor.

Herein, the service policy level information may include a network address (e.g., a uniform resource locator "URL") for accessing the cloud broker (logic within the analysis selection service). Besides the URL, the service policy level information may further include at least an identifier to a customer (referred to as "Customer_ID"). Herein, the Customer_ID may be provided to a customer submitter, namely logic that is configured to communicate with the first subsystem (e.g., the sensor or logic communicatively coupled to the sensor), which allows the customer submitter to identify the customer represented by the sensor to the cloud broker. The Customer_ID may be used by the cloud broker to acquire certain subscription information for use in enforcing subscription requirements as well as selecting a cluster to analyze submitted objects from the customer.

More specifically, the cloud broker may utilize the Customer_ID to conduct a look-up to obtain certain subscription information stored within a data store maintained by the subscription review service. As an illustrative example, the cloud broker may utilize the Customer_ID as an index to recover information associated with the service attributes, for example, (i) rate of data submissions (attributes) guaranteed (or permitted) for the subscription tier selected by the customer and/or (ii) geographic location permissions or restrictions (customer-configured attributes) for clusters or compute nodes. Such subscription information, along with the operational metadata, may be used by the cloud broker to assign a particular cluster for communications with the sensor, and enforce compliance with the service performance level assigned to the customer or the sensor for the particular customer. Such enforcement may include (i) reassigning the sensor to another cluster in response to the current cluster failing to maintain the customer's service performance level after a predetermined amount of time has elapsed, and/or (ii) stopping or throttling continued malware detection services when non-compliance is due to the customer or sensor falling outside a range of operation established for the service performance level (e.g., number or rate of submissions (e.g., objects or metadata) over a prescribed time period, bandwidth usage, etc.), optionally after a predetermined amount of time has elapsed from issuance of an alert to the customer.

Further deployed within the second subsystem, the object evaluation service includes (i) cluster(s) for use in analyzing objects provided by one or more sensors (referred to as "sensor(s)") for malware and (ii) a cluster management system that monitors the operations of each cluster and controls its configuration. The cluster includes at least a cluster broker (hereinafter, "broker compute node"), which is responsible for a second level of control for subscription enforcement for this embodiment. It is contemplated that the cluster management system, in lieu of the cluster broker, may be configured as the second level of control, requiring some or all of the control functionality described below to be incorporated as functionality by the cluster management system.

Implemented as a physical sensor or as a virtual sensor (described below), each sensor is configured to capture network traffic (e.g., incoming data including objects), and perform a preliminary analysis on the network traffic (e.g., content of the object, which may include headers and/or payloads of packets forming or carrying the object). Each sensor is further configured to provide objects deemed "suspicious" (e.g., meets or exceeds an attack threshold representing a level of similarity, with respect to content, between the object under analysis and known malware or cyber-attack components) to a selected cluster for in-depth analysis. A customer may subscribe to the malware detection system in order to utilize the object evaluation service through data submissions from one or more sensors as described above.

As described above, the cloud broker provides the first level of control by at least (a) selecting a cluster to analyze objects that are submitted by a particular customer via a sensor and (b) monitoring operability of the selected cluster to ensure compliance with the service attributes associated with a subscription for the particular customer. The system monitoring logic collects metadata from the cluster management system that may pertain to the operating state of (a) sensor(s) at a subscriber site, (b) cluster(s) that are part of the second subsystem, and/or (c) compute node(s) of a particular cluster or clusters. According to one embodiment of the disclosure, this metadata (referred to as "operational metadata") may include, but is not limited or restricted to, any or all of the following: cluster-based operational metadata, customer-based operational metadata, and/or compute node (CN)-based operational metadata (when the cluster management system is monitoring cluster specific activity), as described below. The receipt of the operational metadata may occur periodically or aperiodically. Also, the operational metadata may be received in response to a query message initiated by the system monitoring logic ("pull"

method) or may be received without any prompting by the system monitoring logic ("push" method).

Based on this operational metadata (and optionally subscription information from the subscription review service), the system monitoring service may generate information (referred to as "cluster selection values") for use by a rules engine within the cloud broker, operating in accordance with installed policy and routing rules, to determine cluster and/or compute node availability. More specifically, the cloud broker relies on the policy and routing rules processed by the rules engine to select the pairing between the cluster and a specific sensor, where the selection of the cluster may be influenced by the cluster selection values from the system monitoring logic and/or subscription information (attributes) accessed from one or more data stores located within the first subsystem and/or the second subsystem using the Customer_ID or Sensor_ID (or included in the service policy level information received from the specific sensor).

The degree of compliance by a selected cluster (represented by certain operational metadata) with certain service attributes for a customer (at least partially defined by the selected subscription tier) may influence load-balancing among the clusters and/or readjustment of sensor/cluster pairing. The degree of compliance may be further influenced by either (i) changes in condition of the assigned cluster or (ii) changes in cluster availability where a cluster different than the currently assigned cluster is better suited to handle analyses (e.g., as new clusters come online or workload demands on clusters change) or (iii) changes in customer or sensor requirements. In fact, in response to determining that the operability of the selected cluster is non-compliant with the subscription attributes and/or customer-configured attributes for the selected subscription tier (e.g., operability falls below a prescribed number of performance thresholds, falls below any performance threshold by a certain amount or percentage, etc.), the cloud broker may issue one or more alert messages ("alerts") to a cybersecurity provider or other entity hosting the selected cluster in efforts to remedy such non-compliance. Additionally, or in the alternative, the cloud broker may perform load-balancing by reassigning the sensor(s) to a different cluster. According to one embodiment, the reassignment may occur "gracefully" by the sensor(s) or cloud broker temporarily storing a portion of the data within the incoming data submissions until reassignment by the cloud broker has been completed.

Where non-compliance is due to changes in operation by the customer or sensor, such as increased number or rate of object submissions for example, the cloud broker may provide one or more alerts to the subscriber management system associated with the non-compliant customer or sensor. Additionally, or in the alternative, the cloud broker may conduct cluster reassignment or stop/throttle malware detection services being provided until the customer alters its subscription to address the non-compliance. This may be achieved by the customer altering its subscription to increase the service performance level assigned to the customer or sensor (e.g., increasing number of submissions per customer or sensor, increase maximum data submission size per customer or sensor, number of authorized sensors for the customer, etc.).

The system monitoring service (along with the cloud broker) may be responsible for assuring that the malware detection system (and specifically the clusters and compute nodes available to perform object evaluation services) are capable of satisfying the service requirements (and, where provided, performance guarantees) of all customers. By evaluating the operational metadata provided by the cluster management system for all clusters against subscription information from the subscription review service regarding all customer registrations (and/or sensor enrollments for object evaluation services), enforcement logic within the cloud broker (or alternatively the system monitoring service) may generate system status information indicating the overall capacity and capability of the malware detection system to service all the registered customers per their aggregated service level requirements. The system status information is provided to system administrators by generating and sending status reports and alerts on demand and/or as system conditions require to allow the system administrators to alter functionality of the malware detection system, as needed.

In summary, as described below, the malware detection system includes enforcement logic (e.g., accounting and license enforcement services provided by the cloud broker), which assures compliance by the customer to the service performance level of the purchased subscription. For example, at enrollment time, the cloud broker may check credential attributes to assure the customer is registered (subscribed), the purchase price has been paid, contact information for the customer (e.g., customer administrator address, e.g., to which alerts should be sent) has been received, or the like. During operation subsequent to enrollment, the enforcement logic will enforce the subscription by assuring service attributes, and in particular the performance attributes, have not been exceeded. If the customer exceeds the rate or number of submissions permitted by its subscription level, for example, the cloud broker will send an alert to a customer administrator to increase (and possibly, if the performance attributes include a minimum (or simply to reduce the customer's expense associated with the subscription) to decrease the subscription level. If the performance attributes (maximums) are still exceeded, the service may be throttled back or suspended.

On the other hand, if it is found by the cloud broker that the operational metadata indicates the subscription requirements across all customers or for any specific customer cannot be satisfied, the cloud broker may send an alert to at least a system administrator for the malware detection system. The administrator may respond by adding additional clusters or compute nodes to the malware detection system, reconfigure existing clusters or compute nodes, or rebalancing the cluster-customer pairings by forcing re-enrollment of sensors of all impacted customers. The same functionality would apply when the subscription requirements for a specific customer cannot be satisfied.

Alternatively, in lieu of or in addition to issuing alerts to a malware detection system administrator, the cluster management system may be configured to respond to non-compliance with respect to the capacity and/or capabilities of the clusters to meet individual or aggregated customer service requirements. In one embodiment, the cluster management system can remedy the non-compliance (present occurring or anticipated as additional customers are serviced) by adjusting or modifying the clusters in accordance with a selected policy (e.g., a set of rules) stored in memory residing within or external from the cluster management system. In some embodiments, the analysis monitoring service may make decisions regarding compliance and cause the cluster management system to effectuate the decisions through adjusting or modifying the clusters The clusters can be adjusted or modified automatically (without the system administrator's involvement) or semi-automatically (with the system administrator approving recommended actions or selecting from options presented by the malware detection system through a user interface. For instance, the clusters can be modified or adjusted by adding a cluster or compute node that is available and operationally ready for installation or boot-up. Additionally, the cluster management system may be configured to adjust capabilities of its managed cluster(s) to assure compliance with customer-configurable and other attributes of subscriptions of subscribing customers. As illustrative examples, the cluster management system may be configured to adjust capabilities of its managed cluster(s) by adding clusters and/or compute nodes to selected clusters to satisfy (i) geographic requirements or preferences offered as a service attribute of a subscription); (ii) configuration requirements or preferences such as software profile(s) to be supported by a cluster, etc.); and/or (iii) storage capacity requirements where queue size constraints are approaching an overflow or underflow condition.

The cloud broker may also be responsible for reporting statistical information associated with analyses (by the selected cluster) of suspicious objects submitted from a sensor associated with the customer to the subscriber management system. The subscriber management system is configured to monitor operations of the sensor as well as other sensors associated with the customer. According to one embodiment of the disclosure, the statistical information may include at least customer-based operational metadata and/or compute node (CN)-based operational metadata (described below), provided from the cluster management system within the second subsystem. The reporting of the statistical information may be responsive to a request for statistical information by the subscriber management system, or alternatively, such reporting may be conducted by the cloud broker without any prompting by the subscriber management system or any network device on its behalf (e.g., periodic transmission of statistical information, aperiodic transmission upon receipt of the statistical information from the cluster management system, etc.).

The subscriber management system is configured to aggregate data associated with data submissions sent to the first subsystem (e.g., cloud broker) from the sensors managed by the subscriber management system to develop a customer-wide view of compliance with subscription requirements. For example, the subscriber management system may also gather information regarding the statistics (e.g., number and percentage of all objects subject to pre-analysis that are submitted for analysis). Based on the aggregated data, the subscriber management system is configured to confirm the accuracy of the statistical information and monitor subscription compliance, where the subscriber management system is provided access to the subscription information. In the case of a discrepancy between the aggregated data and the statistical information or detected non-compliance with the consumer's service performance level, the subscriber management system may send an alert to a prescribed network device to prompt an administrator to investigate the discrepancy or non-compliance. These operations enable the subscriber management system to monitor the activity and health of its sensors as well as compliance with service guarantees indicated by the service performance level.

Moreover, the subscriber management system may be configured with enforcement logic to cause a reduction and/or increase in object submissions caused by non-compliance with the consumer's service performance level. For example, the enforcement logic deployed in the subscriber management system may alter thresholds utilized in its preliminary analysis of metadata for suspiciousness by increasing/decreasing the suspiciousness threshold to reduce/increase the data submission rate. This allows the enforcement logic to throttle or halt use of the malware detection system during a period of consumer or sensor non-compliance.

As further described below, the subscriber management system may be equipped with an interactive user interface (UI) to permit the customer to examine all the statistics on a per sensor basis rather than at a customer-aggregated level. In this regard, the customer may be allowed to allocate or select the service attributes on a per-sensor basis.

I. Terminology

In the following description, certain terminology is used to describe features of the invention. In certain situations, each of the terms "logic", "service," "engine," or "system" are representative of hardware, firmware, and/or software that is configured to perform one or more functions. As hardware, the logic (or engine or system) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or engine or system) may be software in the form of one or more software modules. The software modules may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The "network device" may be construed as an electronic device and/or one or more software modules with data processing and/or networking functionality. Examples of a network device may include, but are not limited or restricted to any type of computer (e.g., desktop, laptop, tablet, netbook, server, mainframe, etc.), a data transfer device (e.g., router, repeater, portable mobile hotspot, etc.), a data capturing/forwarding device (e.g., radio transceiver or tuner, a firewall, etc.), or software that virtualizes operability of the electronic device or certain functionality of the electronic device (e.g., virtual sensor, virtual proxy server, etc.) or other logic type.

One illustrative example of a type of network device may include a sensor or a compute node (e.g., hardware and/or software that operates to receive information, and when applicable, perform malware analysis on that information). Another illustrative example of a type of network device may include an endpoint device (e.g., laptop, tablet, netbook, device-installed mobile software and/or management console) that is configured to receive information propagating over a network, including alerts configurable for delivery to the endpoint device by the customer during registration.

In general, a "customer" may be construed as any entity (e.g., an individual, a company, or an organization being a group of individuals operating within the same or different company, governmental agency, department or division, etc.) considering, seeking, or granted authorized access to the malware detection system. Also, a "subscriber site" may be construed as a collection of network devices, which may be communicatively coupled over a network. The subscriber site may deploy a subscriber management system and one or more sensors which, after credential checks, may gain authorized access to the object evaluation service (deployed within the second subsystem of the malware detection system) via the first subsystem.

The term "computerized" generally represents that any corresponding operations are conducted by hardware in combination with software and/or firmware.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); SSH (Secure Shell); SSH over SSL (SSH over Secure Socket Layer); Simple Mail Transfer Protocol (SMTP), File Transfer Protocol (FTP), iMES SAGE, Instant Message Access Protocol (IMAP), or the like. Hence, each message may be in the form of one or more packets, frames, or any other series of bits having the prescribed format or an API.

The term "service" generally refers to one or more network devices operating individually or collectively to provide on-demand network access to shared data for customer or network device registration and/or enrollment. According to one embodiment, the service may allow for access to a shared pool of configurable resources for analysis of objects for a presence of malware or a detection of a completed or on-going cyber-attack after successful registration and enrollment for that service. Hence, the term "cloud-based" generally refers to a hosted service that is remotely located from a data source and configured to receive, store and process data delivered by the data source over a network. Cloud-based systems may be configured to operate as a public cloud-based service, a private cloud-based service or a hybrid cloud-based service. A "public cloud-based service" may include a third-party provider that supplies one or more servers to host multi-tenant services. Examples of a public cloud-based service include Amazon Web Services® (AWS®), Microsoft® Azure™, and Google® Compute Engine™ as examples. In contrast, a "private" cloud-based service may include one or more servers that host services provided to a single customer (enterprise) and a hybrid cloud-based service may be a combination of certain functionality from a public cloud-based service and a private cloud-based service.

As briefly described above, the term "malware" may be broadly construed as any code, communication or activity that initiates or furthers an attack (hereinafter, "cyber-attack"). Malware may prompt or cause unauthorized, unexpected, anomalous, unintended and/or unwanted behaviors (generally "attack-oriented behaviors") or operations constituting a security compromise of information infrastructure. For instance, malware may correspond to a type of malicious computer code that, upon execution and as an illustrative example, takes advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience attack-oriented behaviors. The attack-oriented behaviors may include a communication-based anomaly or an execution-based anomaly, which, for example, could (1) alter the functionality of a network device an atypical and unauthorized manner; and/or (2) provide unwanted functionality which may be generally acceptable in another context.

In certain instances, the terms "compare," comparing," "comparison," or other tenses thereof generally mean determining if a match (e.g., a certain level of correlation) is achieved between two items where one of the items may include a particular pattern.

The term "transmission medium" may be construed as a physical or logical communication link (or path) between two or more nodes. For instance, as a physical communication path, wired and/or wireless interconnects in the form of electrical wiring, optical fiber, cable, bus trace, or a wireless channel using infrared, radio frequency (RF), may be used.

The term "submission" may correspond to a submission of data directed to a targeted destination (e.g., malware detection system), such that a "data submission" may correspond to metadata associated with an object that is determined to be suspicious and may be subjected to additional malware analysis. Alternatively, or in addition to the metadata, the data submission may include one or more objects provided concurrently with or subsequent to the metadata. The term "object" generally relates to content (or a reference for accessing such content) having a logical structure or organization that enables it to be classified for purposes of malware analysis. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), headers and/or payloads of packets operating as the object, or simply a collection of related data.

The object and/or metadata may be acquired from information in transit (e.g., a plurality of packets), such as information being transmitted over a network or copied from the transmitted information for example, or may be acquired from information at rest (e.g., data bytes from a storage medium). Examples of different types of objects may include a data element, one or more flows, or a data element within a flow itself. A "flow" generally refers to related packets that are received, transmitted, or exchanged within a communication session while a "data element" generally refers to a plurality of packets carrying related payloads (e.g., a single webpage provided as multiple packet payloads received over a network). The data element may be an executable or a non-executable, as described above.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Overall General Architecture

Referring to FIG. 1A, an exemplary block diagram of an illustrative embodiment of a subscription-based, malware detection system 100 is shown. Herein, the malware detection system 100 is communicatively coupled to one or more sensors $110_1$-$110_M$ (M≥1). The sensors $110_1$-$110_M$ may be located at a subscriber site 112 (e.g., located at any part of an enterprise network infrastructure at a single facility or at a plurality of facilities), or as shown, the sensors $110_1$-$110_M$ may be located at different subscriber sites 112 and 114. As illustrated, the malware detection system 100 may be separated geographically from any of the subscriber sites 112 and 114.

According to one embodiment of the disclosure, the malware detection system 100 includes a first subsystem 130 and a second subsystem 160. As shown in FIG. 1A, the first subsystem 130 of the malware detection system 100 may be hosted as part of a public cloud-based service. The second subsystem 160 of the malware detection system 100 may include a private cloud-based object evaluation service 180 operating as an analysis system, which is hosted by a cybersecurity provider or another entity (e.g., different than the customer). Having a high degree of deployment flexibility, in the alternative, the malware detection system 100 can also be deployed as a fully public cloud-based service, as a fully private cloud-based service, or as a hybrid cloud-based service. This flexibility provides optimal scaling with controlled capital expense as well as the ability to control deployment locale to satisfy governmental requirements, e.g., as to sensitive information such as personally identifiable information (PII).

A. Portal—Sensor Architecture

Figure 2:
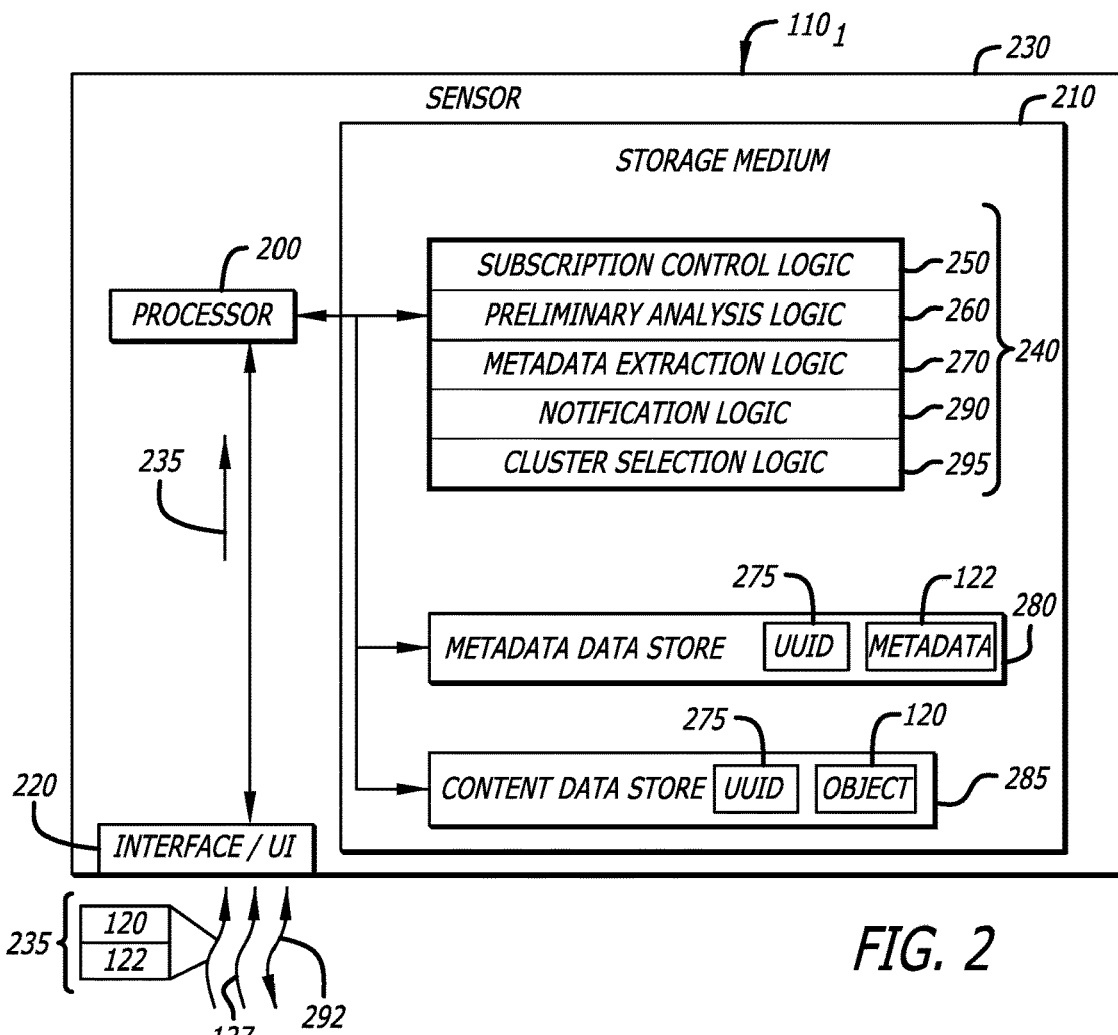
FIG. 2 is a block diagram of an exemplary embodiment of logic implemented within a sensor deployed within the malware detection system of FIGS. 1A-1B.

In FIG. 1A, a sensor $110_1$ may be deployed as a physical sensor (e.g., self-contained network device configured with software to perform the operations as illustrated in FIG. 2) or a virtual sensor (e.g., computer code installed by a customer within a network device). When deployed as a physical sensor, the sensor $110_1$ is identified by a sensor identifier ("Sensor_ID") 115, which may be based on the media access control (MAC) address or another unique identifier (e.g., serial number or network identifier) assigned to the sensor $110_1$. However, when deployed as a virtual sensor, the sensor $110_1$ may be loaded with the Sensor_ID 115 upon registering (subscribing) to the malware detection system 100. According to one embodiment of the disclosure, the credential 116 and/or the Sensor_ID 115 (for use by virtual sensors) may be provided as part of an activation code 117 in response to the customer completing registration (or modifying its subscription) via a portal 165. Herein, the "portal" 165 may be construed as a service including hardware (portal server) that provides access to at least one website hosted by a server to register for a subscription to a cloud-based malware detection system and modify the terms of the subscription.

As shown in FIG. 1A, the portal 165 provides a potential customer with access to one or more websites hosted by a server 166 residing within the second subsystem 160. Of course, as another embodiment (not shown), the portal server 166 may be deployed in the first subsystem 130 or may be remotely located (and external) from both subsystems 130 and 160. Independent of location, the portal server 166 is in communications with logic of a subscription review service 170 within the malware detection system 100.

Using the portal 165, a customer is able to register (subscribe) to services offered by the malware detection system 100 or modify the current terms of the subscription (e.g., change subscription tier, increase/decrease number of authorized sensors, change customer-configured attributes, etc.) to set a service performance level for the customer and/or specific sensors for the customer. As an illustrative example, the portal 165 may provide a customer with access to one or more webpages, which allows the customer to supply customer details (e.g., customer name; address; administrator and preferred contact media such as email address, text or phone number; credit card or banking information for periodic payment for the subscription; network address for subscriber management system, etc.). The webpages may prompt the customer for such customer details and other information using conventional "user interactive" techniques. These may include a web form, e.g., rendered by a conventional web browser of the customer, including one or more online pages that prompts for and accepts customer input.

The portal 165 may further enable the customer to select a subscription tier, which may automatically assign certain subscription attributes for the customer's subscription. These subscription attributes may include certain performance-based attributes (e.g., QoS thresholds, throughput thresholds, etc.) and/or administrative-based attributes (e.g., software update frequency, total number of sensors supported, etc.). Also, the portal 165 allows the customer to customize the subscription through customer-configured attributes (e.g., cluster geographic permissions or restrictions, special guest image software profiles for use in virtualized processing of objects by a selected cluster, alert notification schemes, etc.). Collectively, the information gathered from the customer via the portal 165 is generally referred to as "registration information" 167. A portion of the registration information 167, which pertains to guaranteed system performance and requirements for the customer, corresponds to a portion of the service attributes used in monitoring for compliance with the service performance level assigned to the customer and/or the sensor Upon completing registration (or modification of the subscription) via the portal 165, a message 168 including the activation code 117 may be sent by the portal server 166 to a network device (e.g., subscriber management system 118, endpoint device, etc.), namely the network device used in the registration process or a network device selected by the customer during the registration process. The network device may be located at the subscriber site 112 or external to the subscriber site 112. The message 168 includes at least the credentials 116 that, if installed into the sensor $110_1$, enables the sensor $110_1$ to communicate with the subscription review service 170 for licensing and enrollment purposes. Alternatively, the credentials 116 may be submitted by another network device, where the credentials 116 allow that network device to communicate with the subscription review service 170 to enroll and license the sensor $110_1$ on the customer's behalf B. Sensor—Subscription Review Service Architecture Deployed within the second subsystem 160, the subscription review service 170 is communicatively coupled to the portal server 166 to receive the registration information 167 for a particular customer for storage as part of the subscription information 177. The subscription information 177 may be stored as structured data (e.g., databases, files, etc.) or unstructured data within memory represented as one or more data stores 175. As shown in FIG. 1A, the subscription review service 170 may be deployed within the first subsystem 130 or may be deployed within both subsystems 130 and 160. As a result, the data store(s) 175 may be deployed within the malware detection system 100 (e.g., within the second subsystem 160, within the first subsystem 130, or within both subsystems 130 and 160 where the data store(s) 175 hosted by the first subsystem 130 may feature a mirror copy or a subset of the amount of data stored in the data store(s) 175 hosted by the second subsystem 160).

Furthermore, although not shown, the subscription review service 170 may be communicatively coupled to the analysis selection service 140 and/or the analysis monitoring service 145 to provide subscription information 177 thereto. The subscription information 177 may be used to adjust operability of one or both of these services (e.g., increase or decrease QoS levels, decrease or increase analysis times, decrease or increase cluster availability, etc.).

Using installed credentials 116 provided by the portal server 166, the sensor $110_1$ communicate with the subscription review service 170 to receive a portion of the subscription information (e.g., service policy level information 127), which enables the sensor $110_1$ to communicate with the analysis selection service 140 of the first subsystem 130. The service policy level information 127 may include an identifier of the customer (Customer_ID 128) that may be used by the analysis selection service 140 to access subscription information 177 associated with the customer assigned the Customer_ID 128 in determining what cluster to selected to handle object submissions from the sensor $110_1$ to determine whether a cyber-attack has occurred (e.g., identified by detecting a presence of malware).

C. Cluster Selection Architecture

Referring still to FIG. 1A, the sensors $110_1$-$110_2$ may be positioned at separate ingress points along the subscribing customer's network or subnetwork, or may be positioned in close proximity to one another, perhaps sharing the same hardware (e.g., power source, memory, hardware processor, etc.). For certain deployments, where the sensor $110_1$-$110_2$ are used as edge network devices for subnetworks, sensors may be used to monitor lateral infection between the subnetworks at the subscriber site 112. The sensors $110_1$-$110_2$ may serve as email proxies to receive email traffic being sent to computing assets protected by the customer in order to perform a security analysis.

A sensor (e.g., sensor $110_1$) may conduct a preliminary analysis of network traffic, including data within an object 120 (e.g., data within a header or body of one or more packets or frames within monitored network traffic) to determine whether that object 120 is suspicious. The object 120 may include a portion of information (content) that is intercepted or copied from information being routed over a network, which may be a public network (e.g., the Internet) or a private network such as a wireless data telecommunication network, wide area network, a type of local area network (LAN), or a combination of networks. The sensor $110_1$ may retain metadata associated with each data submission transmitted to the first subsystem 130 by the sensor $110_1$.

The object 120 may be deemed "suspicious" based on an analysis of the object 120 (without execution) and, based on the analysis, determining that the object being associated with a cyber-attack exceeds a prescribed probability. This analysis may include (i) detecting whether the object 120 is sourced by or directed to a particular network device not identified in a "blacklist" or "whitelist," and (ii) an analysis of content of the object 120 (e.g., data patterns, etc.). Hence, the preliminary analysis, in effect, controls the rate and/or number of suspicious objects made available by the sensor $110_1$ for in-depth malware analysis by a selected cluster within the second subsystem 160 and adjustment of the prescribed threshold for suspiciousness (up/down) may adjust (reduce/increase) the submission rate to the malware detection system 100.

In some embodiments, upon completing the preliminary analysis of the network traffic (including suspicious object 120) and having been authenticated to access an object evaluation service 180 of the malware detection system 100 over an established a communication session, the sensor $110_1$ provides at least metadata associated with the suspicious object 120 to the object evaluation service 180 to commence an in-depth malware analysis process of the suspicious object 120 to follow. The results of the preliminary analysis may be made available for use later in the final determination after in-depth analysis of whether the suspicious object 120 is associated with a cyber-attack.

Referring still to FIG. 1A, with respect to the malware detection system 100, an analysis selection service 140 hosted by the first subsystem 130 is responsible for selecting a particular cluster (e.g., cluster $185_1$) of one of more clusters $185_1$-$185_N$ (N≥1), which is deployed within the second subsystem 160, to perform malware analyses on objects provided by a specific sensor (e.g., sensor $110_1$). The analysis selection service 140 selects the cluster $185_1$ after an analysis of data, including the subscription information 177 accessed using the service policy level information 127 and/or a portion of the operational metadata 150 (used to produce "cluster selection values" 157) operating as inputs to the analysis selection server 140.

For example, according to one embodiment of the disclosure, upon receiving the cluster selection values 157 and/or subscription information 177 (recovered using the service policy level information 127), a rules engine 142 operates in accordance with policy and routing rules to select the cluster $185_1$, where the operational metadata 150 associated with the selected cluster $185_1$ indicates that the cluster $185_1$ is able to satisfy performance or operation criteria set forth by subscription attributes and/or customer-configured attributes within the subscription information 177. The policy and routing rules utilized by the rules engine 142 may be static, dynamic (modifiable and updateable) or a hybrid where some of the policy/routing rules are static while others are dynamic. For instance, the policy and routing rules of the rules engine 142 may be preloaded, but some of its rules may be modified or replaced over time. The frequency of the rule modifications may depend, at least in part, on results of prior malware detection by cybersecurity providers, changes in the cyber-threat landscape, and/or the types, targets, and techniques used in recent or potential cyber-attacks. Of course, the policy and routing rules utilized by the rules engine 142 should be broadly construed as any data (rules, models or other logical construct) that attempts to maintain or increase compliance with service guarantees based, at least in part, on the subscription tier of the customer.

Hence, the analysis selection service 140 is configured to select the cluster $185_1$ to perform malware analyses on suspicious objects submitted by a sensor (e.g., sensor $110_1$) based, at least in part, on (i) the subscription information 177 and (ii) the cluster selection values 157. The subscription information 177 is accessible using (or provided as part of) the service policy level information 127 included in an analysis request message 125 while the cluster selection values 157 are based on operational metadata 150 received from the cluster management system 190 deployed within the second subsystem 160 via analysis monitoring service 145 (described below). As a result, the analysis selection service 140 controls the formation and maintenance of a communication session over a communication link 155 between the selected cluster $185_1$ of the object evaluation service 180 and the sensor $110_1$ requesting the communication session over the communication link 155.

After the communication session over the communication link 155 has been established, logic within the analysis selection service 140 (generally referred to as a "cloud broker" 610) is configured to provide information associated with a suspicious object from the requesting sensor $110_1$ to the selected cluster $185_1$ within the object evaluation service 180. Also, this logic may be configured to provide results of a malware analysis on that suspicious object to the requesting sensor $110_1$ or any selected destination by the customer such as another network device.

As shown in FIG. 1A, the analysis monitoring service 145 receives, in a periodic or aperiodic manner, the operational metadata 150 from the second subsystem 160 (e.g., cluster management system 190). As an example, the operational metadata 150 may be directed to the overall health of one or more clusters (e.g., the cluster $185_1$); cluster queue size or queue length; cluster or compute node workload; cluster or compute node geographic location; traffic restrictions on a cluster or compute node basis according to a particular traffic type (e.g., governmental versus commercial traffic, email versus web traffic, or traffic from customers with or exceeding a prescribed subscription level); and/or software profiles (e.g., guest images) supported for processing (e.g., executing, running, activating, etc.) of the suspicious object 120 within one or more virtual machines (used for malware detection) hosted by compute nodes within the cluster $185_1$. As shown, the operational metadata 150 may be received in response to a query message initiated by the analysis monitoring service 145 ("pull" method) or may be received without any prompting by the analysis monitoring service 145 ("push" method). The cluster selection values 157, namely a portion of the operational metadata 150 and/or information produced based at least in part on a portion of the operational metadata 150, is made available to the rules engine 142 within the analysis selection service 140.

According to one embodiment of the disclosure, the cluster selection values 157 corresponds to information that (i) pertains to rule-based parameters utilized by the policy and routing rules and (ii) is generated from the operational metadata 150. Hence, the cluster selection values 157 may be values generated from the operational metadata 150 that are consistent with parameters utilized by the policy and routing rules. As a result, when these values are applied to the policy and routing rules controlling operation of the rules engine 142, the analysis selection service 140 is able to identify which cluster or clusters are available to support another sensor and/or their level of availability and ability to fulfill service attributes. As an illustrative example, where the policy and routing rules include a rule that requires a cluster to have 30% queue capacity to service another sensor and the metadata identifies that the queue size is fifty storage elements and the current queue length is 15 storage elements, the cluster selection values 157 would identify that the cluster has 30% ($15/50$) capacity.

Based at least on the operational metadata 150 described above, the cluster selection values 157 may be values that refine the cluster selection process by identifying which cluster or clusters should be considered or precluded from consideration for data submissions involving a particular type of object and/or a specific customer or specific subscription tier. From still other information (e.g., compute node workload), the cluster selection values 157 may be values that further determine what broker compute node is to be selected for a particular cluster. Additionally, or in the alternative, the cluster selection values 157 may include or may be based on information associated with one or more sensors $110_1, \ldots,$ and/or $110_N$ or information based on prior communication sessions by the sensor(s) $110_1, \ldots,$ and/or $110_N$ such as sensor activity (e.g., number of submissions, amount of analysis time performed on objects by the particular sensor, number of malicious objects detected for a particular sensor, number of timeouts triggered, or the like).

In summary, the following operations are performed before the sensor (e.g., sensor $110_1$) is able to provide data for analysis (referred to as a "data submission 124" and illustrated in FIG. 1B) to the malware detection system 100:

(a) a submitter (e.g., sensor $110_1$) obtains service policy level information 127 that includes credentials (e.g., the Customer_ID 128, user name, password, and/or keying material), and optionally attributes that may be used in cluster selection by the analysis selection service 140;

(b) submitter (e.g., sensor $110_1$) is authenticated to access services provided by the malware detection system 100 using (i) its Submitter_ID (e.g., Sensor_ID 115, where Sensor_ID-Customer_ID mapping is provided to access subscription information 177 associated with the Customer_ID 128 from the data store(s) 175); (ii) Sensor_ID 115 or Customer_ID 128 included as part of the service policy level information 127 is used to access the subscription information 177 from the data store(s) 175 and the Sensor_ID 115 used to identify routing path of signaling (e.g., control messages, data, etc.) from the object evaluation service 180; or (iii) portions of the subscription information 177 included as part of the service policy level information 127.

(c) the analysis selection service 140 (cloud broker) selects a cluster (e.g., cluster $185_1$) to handle malware analyses for the sensor $110_1$ based on incoming cluster selection values 157 via analysis monitoring service 145, and certain subscription information 177 (e.g., certain subscription attributes, customer-configured attributes, etc.) provided as part of (or accessible using) the service policy level information 127 as described in subsection (b) above; and (d) the analysis selection service 140 (cloud broker) establishes the communication session over the communication link 155 with the cluster $185_1$.

D. Data Submission Architecture

Figure 1B:
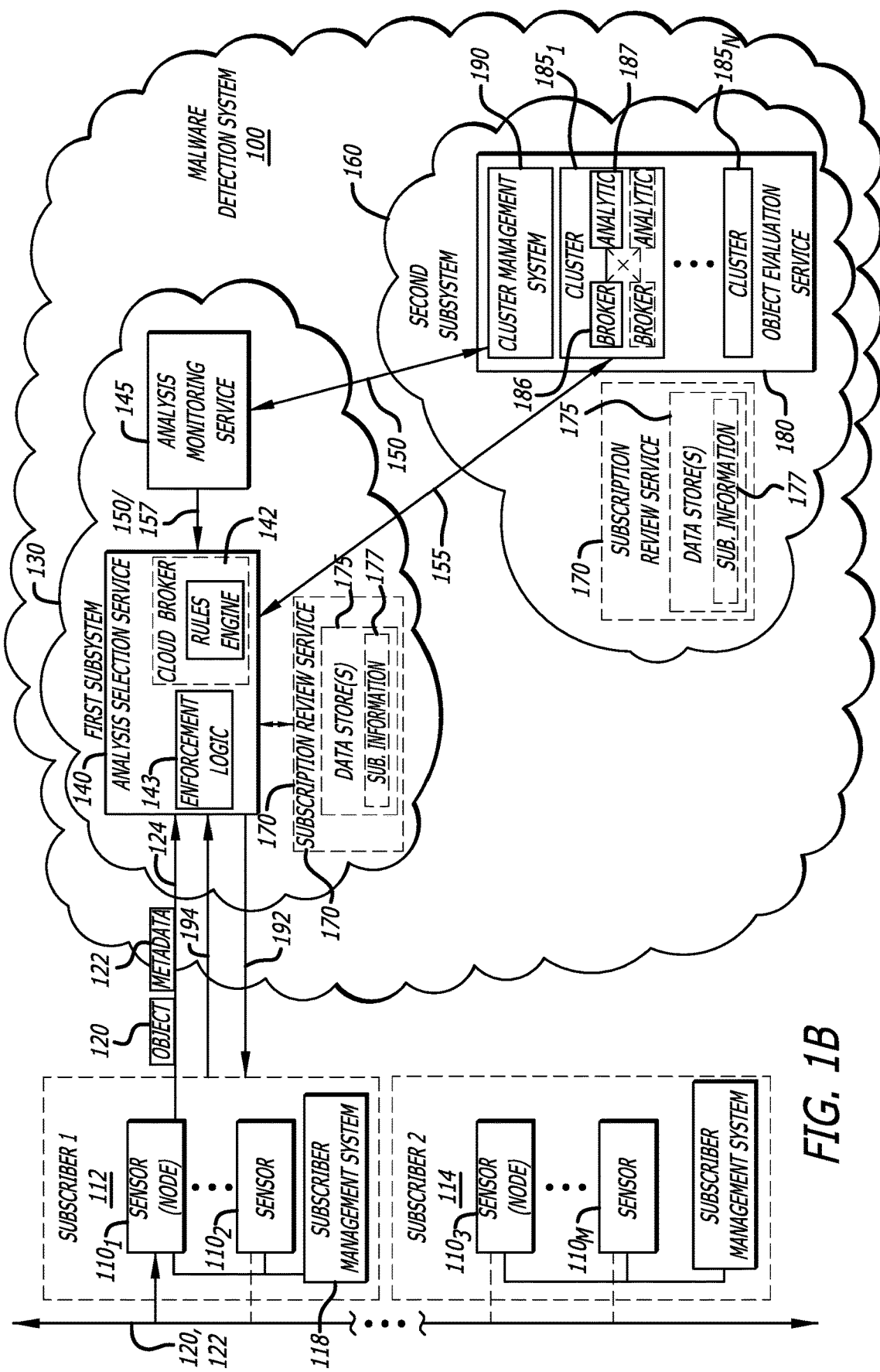
FIG. 1B is a block diagram of an exemplary embodiment of the malware detection system of FIG. 1A directed to an analysis of submitted objects for malware and report generation.

According to one embodiment of the disclosure, as shown in FIG. 1B, the data submission 124 may include the object 120 and/or metadata 122 associated with the object 120. Herein, according to this embodiment, the data submission 124 includes the metadata 122 while the object 120 is temporarily stored by the sensor $110_1$ and uploaded at a later time. Alternatively, it is contemplated that the sensor $110_1$ may concurrently upload the object 120 and its corresponding metadata 122 to the malware detection system 100 for processing.

For instance, the sensor $110_1$ may later upload the object 120 to the object evaluation service 180 via the analysis selection service 140 for malware analysis. This upload may occur once the malware detection system 100 confirms, based on analysis of the metadata 122, that (a) the object 120 has not been analyzed previously and (b) a particular compute node within a selected cluster is ready to analyze the object 120. If the malware detection system 100, such as the broker compute node 186 for example, determines that the suspicious object 120 has been previously analyzed, the first subsystem 130 may include logic that returns results from previously analyzed objects upon detecting a high correlation between the metadata 122 associated with the suspicious object 120 and metadata associated with a previously analyzed object before submission of the suspicious object 120. This logic may be implemented to avoid unnecessary analysis to improve response time and mitigate potential false positives or false negatives.

According to one embodiment of the disclosure, a first enforcement logic 143, separate from the licensing and enrollment services offered by the subscription review service 170, may be implemented in the first subsystem 130 and configured to monitor data submissions by the customer and account for all of the analysis and actions undertaken that exceed the terms of a license (subscription), namely non-compliance with the service performance level assigned to the customer as represented by the service attributes and/or the service performance level assigned to the sensor.

Additionally, the first enforcement logic 143 is further configured to enforce compliance with the service performance level assigned to the customer or the sensor for the particular customer based on an analysis of a portion of the operational metadata 150 along with at least some of the service attributes within the data store(s) 175. Where non-compliance is due to changes in customer or sensor requirements, such as certain performance-based attributes for the subscription have been exceeded, the first enforcement logic 143 of the cloud broker 610 may provide one or more alerts to a customer administrator (e.g., via the subscriber management system 118 associated with the non-compliant customer at subscriber site 112, a network device accessed by the customer administrator identified at registration, or the non-compliant sensor 110$_1$ to prompt a change in the selected subscription tier). Additionally, the first enforcement logic 143 may signal the cloud broker 610 to begin a cluster reassignment or stop/throttle malware detection services being provided until the customer alters its subscription to address non-compliance or, even after adjustment of the subscription tier, the customer still remains non-compliant with the terms of the subscription.

The software associated with this service may further implement a "pay-as-you-go" licensing feature, which keeps track of all of the data submissions by a customer and charges based on usage of the malware detection system 100. This licensing feature provides for pre-payment of some reserved object analysis capacity, potentially at a cost savings.

Additionally, the first enforcement logic 143 may be configured to confirm the current subscription status assigned to the customer associated with the sensor 110$_1$ that is attempting to upload the suspicious object 120 into the malware detection system 100 for analysis. This confirmation may be accomplished by accessing the data store(s) 175 within the malware detection system 100 using the Sensor_ID 115 or the Customer_ID 128 provided by the sensor 110$_1$ as an index to obtain credential attributes within the subscription information 177 pertaining to the customer. For example, at enrollment time, the first enforcement logic 143 may check credential attributes to assure the customer is registered (subscribed), the purchase price has been paid, contact information for the customer (e.g., administer address) has been received, etc. Alternatively, this confirmation may be accomplished by using the Sensor_ID 115 to determine the Customer_ID 128 within a Sensor_ID-Customer_ID mapping, and thereafter, conduct a database lookup using the Customer_ID 128 concerning subscription status.

In more general terms, the confirmation of the current subscription status may involve a first determination by the first enforcement logic 143 as to whether the customer has an active subscription to the malware detection system 100. If the customer does not possess an active subscription to the malware detection system 100, the sensor 110$_1$ may be precluded from establishing the communication session over the communication link 155 and uploading information into the object evaluation service 180 for analysis. Upon determining an active subscription, the first enforcement logic 143 selects a cluster (second determination) using certain subscription information 177. The certain subscription information 177 may include, but is not limited or restricted to the following: (a) subscription attributes including subscription tier, QoS thresholds, permissions, access control information, cluster availability details such as a listed default cluster, cluster selection ordering or preferences, and/or cluster restrictions; (b) customer-configured attributes including geographic location permissions or restrictions for compute nodes in processing objects for the sensor 110$_1$, type of remediation selected by the customer, type of alert notification selected by the customer (medium, destination, etc.); (c) factory set attributes including default cluster permissions; and/or (d) operational attributes including heuristic (and dynamic) data based on past historical operations.

Thereafter and concurrent to these operations, the first enforcement logic 143 of the cloud broker 610 enforces the subscription by assuring that maximum thresholds included as part of the service performance levels (as described above) are not exceeded and minimum thresholds are met. Upon determination by the cloud broker 610, based on the operational metadata, that the minimum performance service levels across the particular customer or all customers cannot be satisfied (e.g., cluster failure/maintenance, compute node failure/maintenance, etc.), the cloud broker 610 will send an alert to at least a system administrator for the malware detection system 100. The administrator may respond by (i) adding additional clusters (e.g., cluster 185$_3$) to the malware detection system 100 or one or more additional compute nodes, (ii) reconfigure the selected cluster 185$_1$ or its compute nodes, or the like. Additionally, the cloud broker 610 may rebalance the cluster-customer pairings by forcing re-enrollment of the sensor 110$_1$ and/or any sensors of impacted customers. This may be effected, e.g., by the cloud broker sending an appropriate message to the sensor(s) or subscriber management system 118 to cause the sensor(s) to re-enroll following the same process as that described above for enrollment. Similar operations would be applicable when the subscription requirements for a specific customer cannot be satisfied.

It is contemplated that an OEM or another party hosting the object evaluation service 180 may configure the service so that an attribute may be categorized as a subscription, customer-configured, factory set, or operationally dynamic attribute. Also, some customer-configured attributes may allow customers to tailor operability that is not offered by the base attributes associated with a subscription tier. The OEM or the other party can decide which attribute or attributes should be configured in conjunction with which subscription level.

Additionally, the first subsystem 130 is configured to generate and transmit statistical information 192, which may be prompted in response to a management query message 194 (as shown) or provided without being in response to signaling from the subscriber site 112. The management query message 194 may correspond to a request for data that is directed to the operability of a particular sensor or the cluster(s). For instance, the statistical information 192 may be provided to the subscriber management system 118 or a centralized management system (not shown) accessible by more than one customer site, where the central management system may be configured to aggregate the information associated with all sensors and provides a report, e.g., via a user interface, to the customer on operational statistics, results of analysis, and subscription compliance details. Deployed as a physical network device including a processor and/or memory or as a virtualization (in software), the subscriber management system 118, in some embodiments, is also responsible for receiving customer selections of available configurable attributes, as elsewhere described.

According to one embodiment of the disclosure, the statistical information 192 may include a portion of the operational metadata 150 such as at least a portion of the customer-based operational metadata and/or the compute node (CN)-based operational metadata (described below). Besides receipt of the statistical information 192, the subscriber management system 118 aggregates data associated with data submissions sent to the cloud broker 610 from the sensors $110_1$-$110_2$ managed by the subscriber management system 118. Such data gathering develops a customer-wide view for use in compliance with the established service performance level for the subscription and customer statistics (e.g., number or percentage of objects subject to pre-analysis that are provided for subsequent analysis by the object evaluation service 180). Furthermore, based on the aggregated data, the subscriber management system 118 (with access to the subscription information 177) may confirm accuracy of the statistical information 192 and/or monitor compliance with the service performance level assigned to the customer and/or sensor $110_1$ as described above.

In the case of a notable discrepancy between the aggregated data and the statistical information 192 (e.g., exceeding a set amount of discrepancy to avoid repeated investigation alerts) or a finding of non-compliance with the service performance level, the subscriber management system 118 is configured to (i) send an alert to a prescribed network device associated with an administrator of the subscriber site 112 to prompt an investigation as to the discrepancy or non-compliance. As a result, the subscriber management system 118 is able to (i) monitor, in real-time, the activity and health of the sensor $110_1$ and (ii) enforce compliance with service guarantees indicated by the service performance level assigned to the customer or the sensor $110_1$.

It is contemplated that, in lieu of the management query message 194, the first subsystem 130 may provide the statistical information 192 to the subscriber management system 118 in accordance with a "push" transmission scheme. This transmission scheme may be conducted periodically or upon termination of a communication session between the sensor $110_1$ and the selected cluster $185_1$.

The object evaluation service 180 includes one or more clusters $185_1$-$185_N$ (N≥1). Each cluster $185_1$-$185_N$ may be configured to conduct an analysis of a suspicious object (e.g., object 120) provided by one of the sensors $110_1$-$110_M$ that is enrolled to the subscription-based malware detection system 100. As described above, each cluster $185_1$ . . . or $185_N$ is a scalable architecture, which includes at least one compute node in which additional compute nodes may be added as needed to handle an increased number of object analyses caused by increased network traffic at a subscriber site (e.g., subscriber site 112).

According to one embodiment, the cluster $185_1$ includes a plurality of compute nodes, including (i) one or more compute nodes 186 each operating as a "broker" compute node and (ii) one or more compute nodes 187 each operating as an "analytic" compute node. Herein, a broker compute node 186, operating as the second level of control, may be configured to perform to at least determine, from received metadata 122 associated with the data submission 124 (e.g., hash value for the object 120 being part of the metadata 122), whether the suspicious object 120 has been previously processed by the malware detection system 100.

If the suspicious object 120 has not been previously processed by the malware detection system 100, the broker compute node 186 causes the loading of the metadata 122 into a queue 310. Thereafter, based on processing availability, a broker compute node 186 or an analytic compute node 187 gains access to the metadata 122 and uses the metadata 122 (or data accompanying the metadata such as an object identifier 275 of FIG. 2, attributes, or tags) to retrieve the suspicious object 120 from a data store within the sensor that submitted the metadata 122 (e.g., sensor $110_1$). Alternatively, the suspicious object 120 may be stored in memory separate from the sensor $110_1$, within a data store within the subscriber management system 118, or within data storage within the first subsystem 130. Upon receipt of the suspicious object 120, the object requesting broker or analytic compute node determines whether the suspicious object 120 is associated with malware.

If the suspicious object 120 has been previously processed by the malware detection system 100, the results of the prior analysis may be reported by the broker compute node 186 to a network device chosen by the customer to receive the results via the first subsystem 130. The network device may include the sensor $110_1$, the subscriber management system 118 or an endpoint device via the portal 165. In some embodiments, however, the sensor $110_1$ may provide the results to the subscriber management system 118.

III. Subscriber Site/Sensor Components and Operation

Referring now to FIG. 2, a block diagram of an exemplary embodiment of logic implemented within a physical deployment of the sensor $110_1$ in communication with the malware detection system 100 of FIGS. 1A-1B is shown. According to this embodiment of the disclosure, the sensor $110_1$ comprises one or more hardware processors 200 (generally referred to as "processor"), a non-transitory storage medium 210, and one or more interfaces 220 (generally referred to as "interface"). These components are at least partially encased in a housing 230, which may be made entirely or partially of a rigid material (e.g., hard plastic, metal, glass, composites, or any combination thereof) that protects these components from environmental conditions.

In an alternative virtual device deployment, however, the sensor $110_1$ may be implemented entirely as software that may be loaded into a network device (as shown) and operated in cooperation with an operating system ("OS") running on that device. For this implementation, the architecture of the software-based sensor $110_1$ includes software modules that, when executed by a processor, perform functions directed to functionality of logic 240 illustrated within the storage medium 210, as described below.

The processor 200 is a multi-purpose, processing component that is configured to execute logic 240 maintained within the non-transitory storage medium 210 operating as a data store. As described below, the logic 240 may include, but is not limited or restricted to, (i) subscription control logic 250, (ii) preliminary analysis logic 260, (iii) metadata extraction logic 270, (iv) notification logic 290, and/or (v) cluster selection logic 295. One example of processor 200 includes an Intel® (x86) central processing unit (CPU) with an instruction set architecture. Alternatively, processor 200 may include another type of CPUs, a digital signal processor, an Application Specific Integrated Circuit (ASIC), a field-programmable gate array, or any other hardware component with data processing capability.

Figure 6A:
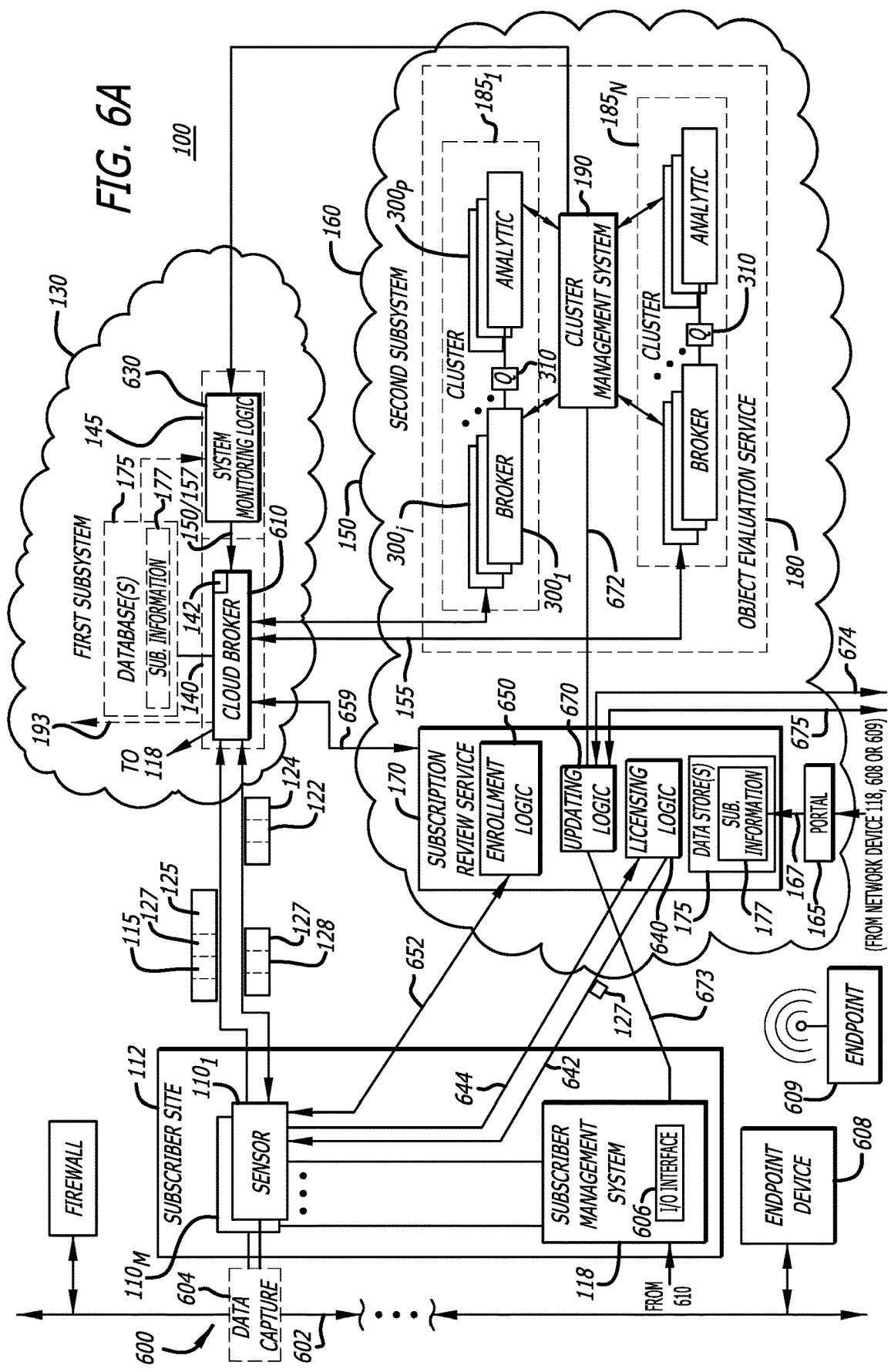
FIG. 6A is an embodiment of the operational flow conducted by the malware detection system of FIGS. 1A-1B in establishing communications with on-site sensors.

According to one embodiment of the disclosure, the sensor $110_1$ may include subscription control logic 250 that controls the signaling (handshaking) with the subscription review service 170, such as the licensing logic 640 and/or enrollment logic 650 as shown in FIG. 6A. Such signaling enables the sensor $110_1$ to acquire credentials that are part of the service policy level information 127 of FIG. 1A (e.g., Customer_ID, username, password, keying material, etc.) as well as an uniform resource locator (URL) or other communication address for accessing the cloud broker 610 of FIG. 6A. Additionally, the subscription control logic 250 may maintain information associated with a subscription expiration time that, if the subscription is not extended through renewal, the subscription control logic 250 disables communications with the assigned cluster $185_1$ and/or signals a customer that renewal payments are due to continue the subscription to the malware detection system 100 or upgrade to a more robust service policy (subscription) level.

According to one embodiment of the disclosure, as shown, the interface 220 is configured to receive incoming data 235 propagating over a network, including the metadata 122 and/or the object 120. The incoming data 235 may be received directly from the network or via a network tap or Switch Port Analyzer (SPAN) port, also known as a mirror port, provided by the sensor $110_1$. Processed by the processor 200, the preliminary analysis logic 260 may conduct an analysis of at least a portion of the incoming data 235, such as headers/payloads of packets of the incoming object 120 for example, to determine whether the object 120 is suspicious. Furthermore, the metadata extraction logic 270, during such processing, may extract metadata 122 from the incoming data 235 and assign an object identifier 275 to correspond to both the metadata 122 and the suspicious object 120. The object identifier 275 may be unique among the clusters $185_1$-$185_N$ (referred to as "universally unique identifier" or "UUID" 275). It is contemplated that the UUID 275 may be included as part of the metadata 122.

According to one embodiment of the disclosure, the metadata 122 (with the UUID 275) may be stored in a metadata data store 280. Similarly, the suspicious object 120 and UUID 275 may be stored in a content data store 285. The content data store 285 may be part of the non-transitory storage medium 210 of the sensor $110_1$. It is contemplated, however, that the content data store 285 may be located externally from the sensor $110_1$.

The sensor $110_1$ further includes notification logic 290, which is responsible for handling communications 292 via communication session over the communication link 155 with the selected cluster $185_1$ via the analysis selection service 140 of FIGS. 1A-1B. Such communications 292 may include (i) analysis results or (ii) information that signifies (a) the suspicious object 120 has already been analyzed or (b) a timeout event has been detected for the metadata 122 that originated from the sensor $110_1$, where a "timeout event" denotes that the suspicious object 120 has not been analyzed by the object evaluation service 180 of FIGS. 1A-1B within a time allotted by the service policy level information 127 associated with the subscription for the customer or by the sensor $110_1$.

Some embodiments of the sensor $110_1$ may include the cluster selection logic 295. Operating in combination with subscription control logic 250 and/or preliminary analysis logic 260, the cluster selection logic 295 is adapted to control, based on the service policy level information 127 associated with the subscription for the customer, the cloud broker to select between an on-premises cluster (or malware detection system) that resides on the same enterprise network as sensor $110_1$ (not shown) or an off-premises cluster within malware detection system 100 of FIGS. 1A-1B. More specifically, according to one embodiment, an attribute pertaining to the customer (e.g., customer-configured attribute) may specify the customer's preference regarding on-premises or off-premises cluster selection. This customer-configured attribute may be provided to the sensor $110_1$ during the enrollment/licensing phase.

Hence, where the selected default cluster is a cluster within the (cloud-based) object evaluation service 180, the on-premises cluster may be deployed to provide extra capacity when malware analysis thresholds established for cloud-based analyses allowed in accordance with the customer's subscription level have been exceeded. Alternatively, one or more off-premises clusters may be deployed to provide extra capacity when the on-premises cluster is selected as the default cluster and the malware analysis thresholds provided by the on-premises clusters have been exceeded.

It is contemplated that routing decisions for the metadata 122 to either (i) on-premises cluster or (ii) off-premises cluster via the analysis selection service 140 may be based on any number of factors. These factors may include, but are not limited or restricted to object type (e.g., portable document format "PDF" objects are directed to an on-premises cluster and binaries are directed to off-premise cluster); customer type (e.g., objects extracted from network traffic originating from certain customers, e.g., governmental agencies are directed to an on-premises cluster while objects extracted from network traffic originating from other governmental agencies are directed to an off-premises cluster); capacity (e.g., objects are directed to an off-premises cluster until a capacity (or subscription) threshold reached); and/or network security level (e.g., objects extracted from network traffic over protected subnetworks are directed to an on-premises cluster while objects extracted from network traffic over unprotected subnetworks are directed to an off-premises cluster).

IV. Cluster Components and Operation

Figure 4:
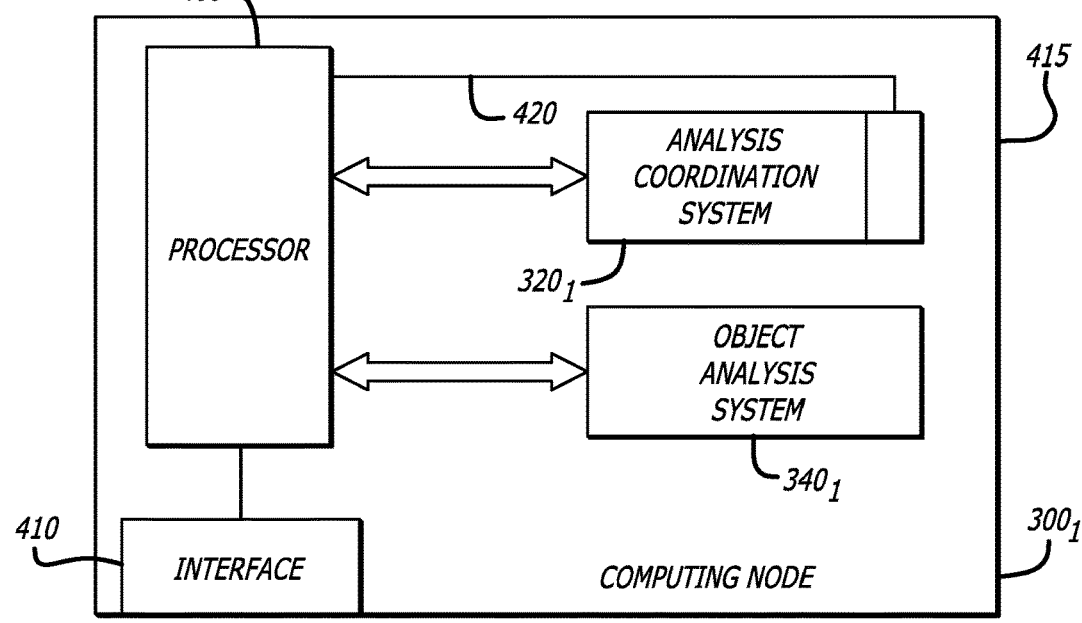
FIG. 4 is an exemplary embodiment of a compute node being part of the cluster of FIG. 3.
Figure 3:
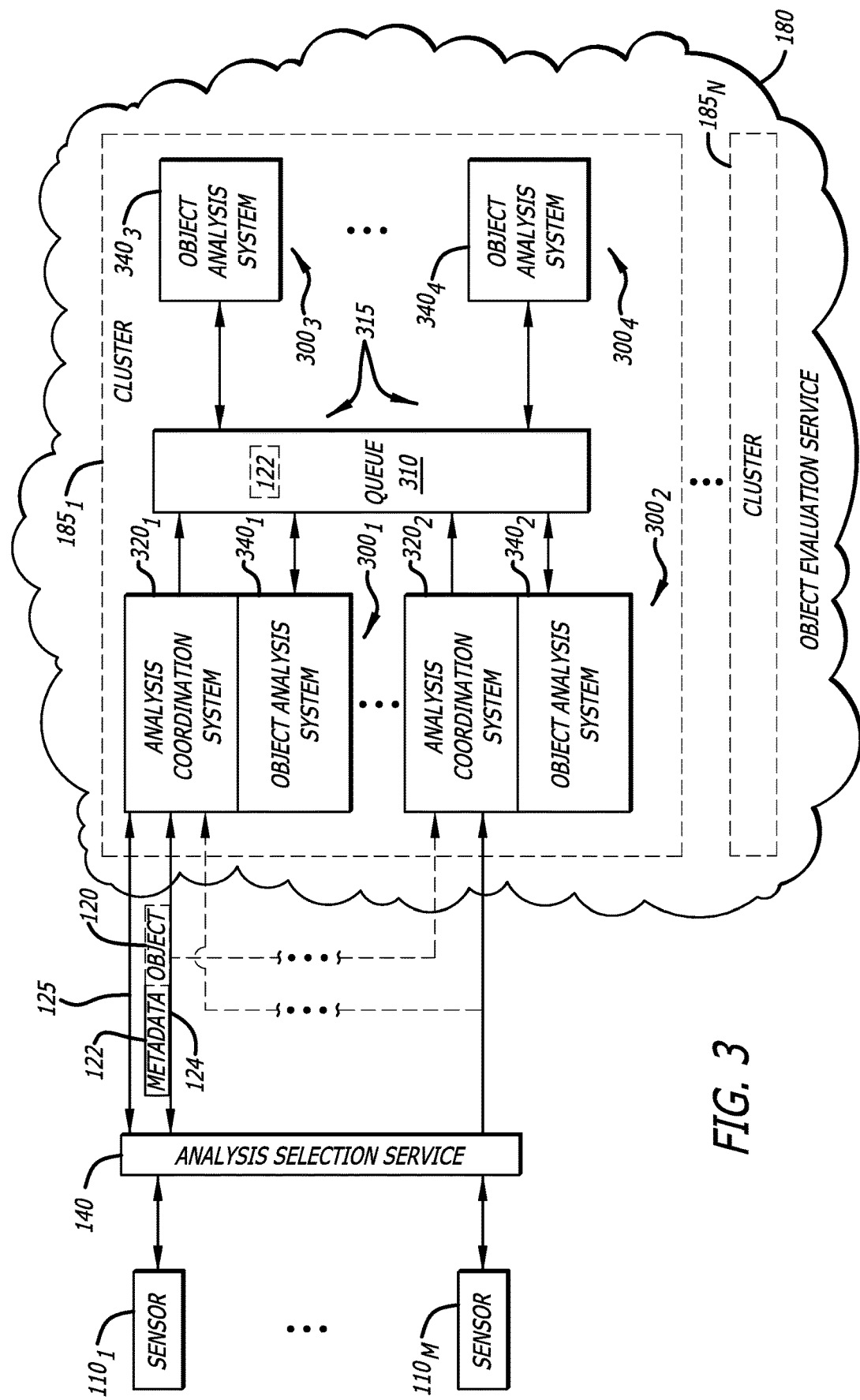
FIG. 3 is an exemplary embodiment of a cluster implemented within the object evaluation service hosted by the second subsystem of the malware detection system of FIGS. 1A-1B.

Referring now to FIG. 3, an exemplary embodiment of logic implemented within the cluster $185_1$ of FIG. 1B is shown. The cluster $185_1$ comprises a plurality of compute nodes $300_1$-$300_P$ (P≥1), which are communicatively coupled to a distributed queue 310 (e.g., a logical representation of the collective memory formed by queue memories for each cluster $185_1$-$185_N$) over a first network 315. Each compute node (e.g., compute node $300_1$) may feature an analysis coordination system $320_1$ and an object analyzer (e.g., object analysis system $340_1$). As shown in FIG. 4, analysis coordination system $320_1$ may be activated or deactivated, such as activation or deactivation of a control line 420 by processor 400, where the compute node $300_1$ operates as a "broker" compute node when the analysis coordination system $320_1$ is activated or operates only as an "analytic" compute node when the analysis coordination system $320_1$ is deactivated (e.g., compute nodes $300_3$ and $300_4$). As an alternative embodiment, it is contemplated that a "broker" compute node may have a logical architecture different than an "analytic" compute node. For example, a broker compute node may be configured with only an analysis coordination system. An analytic compute node may be configured with only an object analysis system.

Returning back to FIG. 3, sensors $110_1$-$110_M$ are communicatively coupled to one or more broker compute nodes (e.g., compute node $300_1$ and compute node $300_2$) of the first cluster $185_1$ via the analysis selection service 140 of FIG. 1B. In some embodiments, in lieu of directing communications via the analysis selection service 140, the communications may be sent directly to the cluster (broker computer node) once the cloud broker 610 of FIG. 1A notifies the sensor (e.g., sensor $110_1$) of the cluster selection. Any of the analysis coordination systems $320_1$ and $320_2$ (e.g., system $320_1$) may be selected by the analysis selection service 140 to receive metadata 122 from any of the sensors $110_1$-$110_M$ (e.g., sensor $110_1$) for storage within the distributed queue 310. The metadata 122 may be retrieved by an object analysis system $340_1$-$340_4$ that is available for analyzing the suspicious object 120 associated with the metadata 122 for malware.

As further shown in FIG. 3, according to this embodiment of the disclosure, the analysis coordination systems $320_1$ and $320_2$ for the respective "broker" compute nodes $300_1$ and $300_2$ have been activated while the analysis coordination systems (not shown) for compute nodes $300_3$ and $300_4$ have been deactivated. It is noted, in some embodiments, the compute nodes $300_1$-$300_4$ within the same cluster $185_1$ feature an object analysis system $340_1$-$340_4$, respectively. Each of these object analysis systems $340_1$-$340_4$ includes logic that is capable of conducting an in-depth malware analysis of the suspicious object 120 upon determining to have sufficient processing capability.

According to one embodiment of the disclosure, one of the object analysis systems $340_1$-$340_4$ accesses the queue 310 to obtain the metadata 122 associated with the suspicious object 120 awaiting malware analysis. The queue 310 may be accessed when the object analysis system (e.g., object analysis system $340_1$) determines to have sufficient processing capability to meet the required analysis. The determination may occur, for example, by (i) passing at least one service attribute with the metadata 122, (ii) accessing the attribute by the object analysis system $340_1$ prior to removal of the metadata 122 from the queue 310, and (iii) determining whether the object analysis system $340_1$ can process the suspicious object 120 in accordance with preset criteria. Likewise, during operation, the object analysis system $340_1$ may periodically and/or aperiodically (e.g., in response to completion of a prior malware analysis) access the queue 310 and obtain the metadata 122 associated with the suspicious object 120.

According to another embodiment of the disclosure, additionally or alternatively to the processing capability determination described above, the metadata 122 stored in the queue 310 may be prioritized for removal and subsequent retrieval and analysis of the corresponding object. For example, according to one embodiment of the disclosure, the prioritization of the metadata 122 stored in the queue 310 may be in accordance with object type (e.g., metadata associated with an object of a first type is queued at a higher priority than metadata associated with an object of a second type). As another example, the prioritization of the queue 310 may be in accordance with the subscription level assigned to the customer, namely metadata associated with an object submitted by a customer or any of a group of first customers at a first service policy level (e.g., first QoS threshold) is queued at a higher priority than metadata associated with an object submitted by a customer or any of a group of second customers at a second service policy level. For prioritization, each customer may be separate a company or a separate unit (department) in the same company.

In summary, a broker compute node $300_1$, targeted to receive the suspicious object 120, places the metadata 122 into the queue 310. Retrieval of the metadata 122 may be performed by any of the plurality of compute nodes $300_1$-$300_P$, including broker compute node $300_1$. This retrieval may be organized in accordance with a plurality of queue retrieval schemes. For instance, the retrieval may be in accordance with a first-in, first-out (FIFO) queue scheme for fairness and controlled latency of submission analysis. Alternatively, the retrieval may be prioritized. As an illustrative example, the metadata from a customer with a higher (premium) subscription may be assigned to a different (higher priority) queue that is serviced first. As another example, the metadata may be tagged (i) to identify the metadata submitted by a higher subscription customer than a normal subscription customer or (ii) identify metadata from customers where three or more different subscription levels are available. The tagged metadata allows the compute node to read the top "L" queued metadata submissions (e.g., L≥2) and select the highest priority metadata submission from the L submissions.

Upon retrieval of the metadata 122 and based on at least a portion of the metadata 122, the object analysis system $340_1$ is able to determine the storage location of the suspicious object 120. Thereafter, the object analysis system $340_1$ may retrieve the suspicious object 120. The suspicious object 120 may be stored in the sensor $110_1$, in the compute node $300_1$, or in an external network device (not shown) that may be accessed via the analysis selection service 140 of FIGS. 1A-1B.

Upon receipt of the suspicious object 120, the object analysis system $340_1$ conducts an in-depth malware analysis, namely any combination of attack-oriented behavior (dynamic) analysis or static analysis, in order to determine a probability of the suspicious object 120 being associated with malware. Such operations may involve execution of the suspicious object 120 within a virtual machine operating with the object analysis system $340_1$, where the virtual machine is configured with one or more software profiles (e.g., one or more software components including operating system, application(s), and/or plug-in(s)) allowing the virtual machine to execute the suspicious object 120 and monitor attack-oriented behaviors of the virtual machine, including any of the software components. Thereafter, the object analysis system $340_1$ performs a correlation operation on the monitored attack-oriented behaviors (e.g., analyzes the monitored behaviors against known malicious behaviors and behavioral patterns) to determine if the suspicious object 120 is associated with a cyber-attack.

As an illustrative example, the analysis coordination system $320_1$ may be selected by the analysis selection service 140 of FIGS. 1A-1B to receive the metadata 122 associated with the suspicious object 120 and provide information, which may include some or all of the metadata 122, to the queue 310. Thereafter, the analysis coordination system $320_1$ has no involvement in the routing of such metadata to any of the object analysis systems $340_1$-$340_4$ of the compute nodes $300_1$-$300_4$. Instead, an object analysis system (e.g., object analysis system 3403) having sufficient processing capability (e.g., processor utilization, etc.) to handle a deeper level analysis of the suspicious object 120 may fetch the metadata 122 that is stored in the queue 310 and subsequently fetch the suspicious object 120 based, at least in part, on a portion of the metadata 122.

V. Overall Operational Flow

Figure 5A:
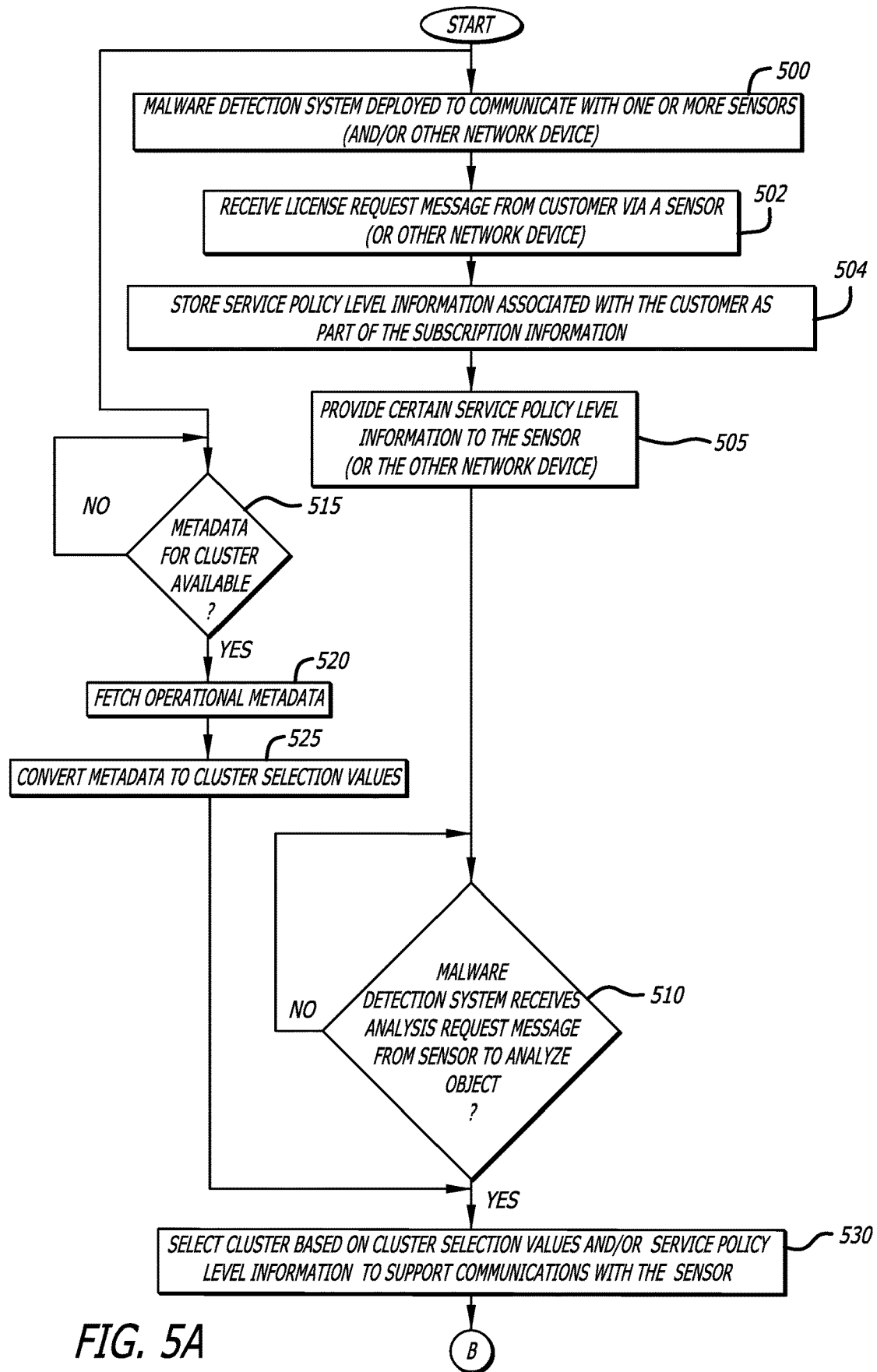
FIGS. 5A-5B are an exemplary flowchart of the general operations performed by the malware detection system of FIGS. 1A-1B.
Figure 5B:
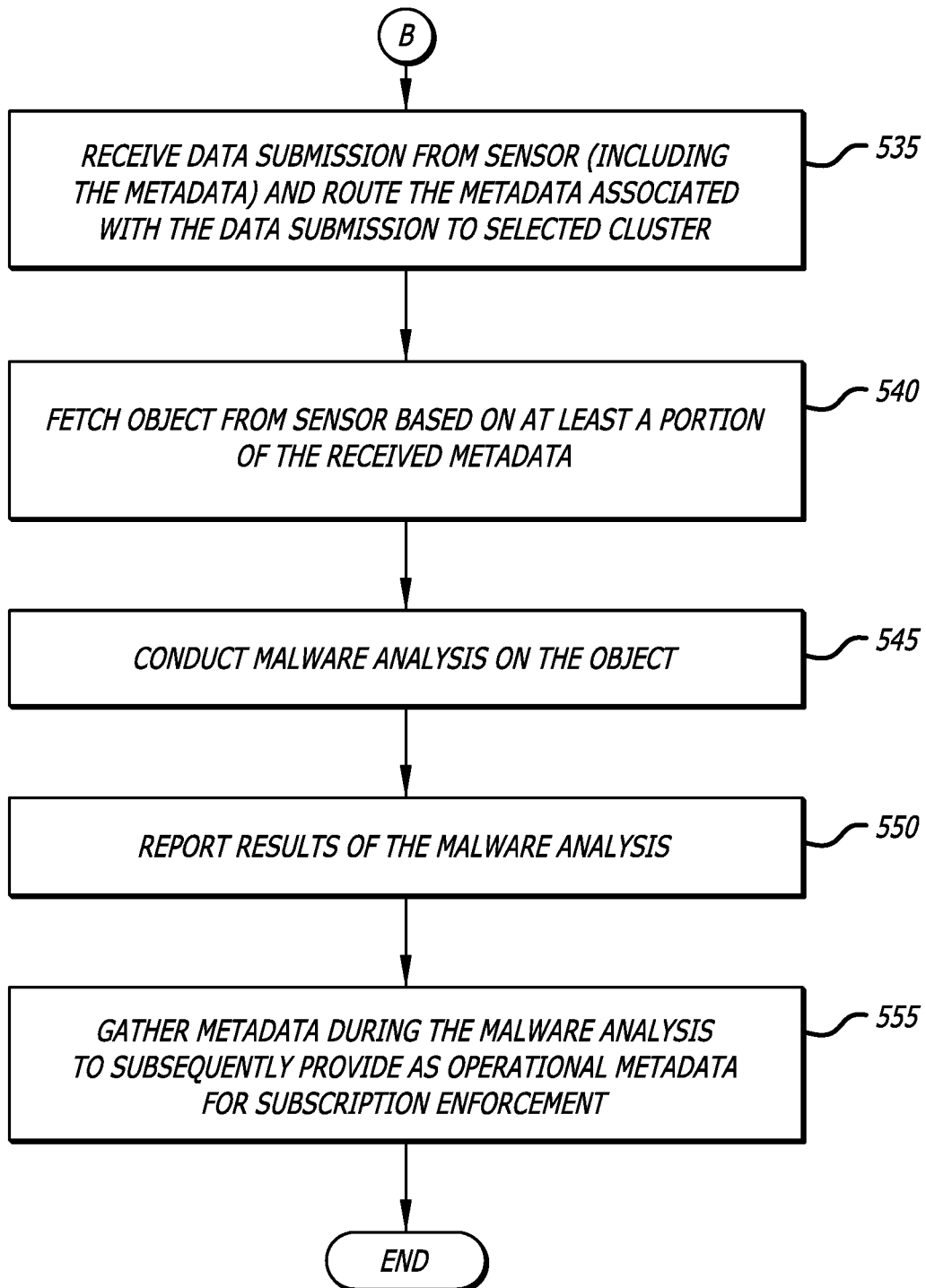

In summary, as shown in FIGS. 5A-5B, while referencing FIGS. 1A-4, the malware detection system 100 is configured to communicate with one or more sensors $110_1$-$110_M$, where each sensor $110_1$ . . . or $110_M$ is configured to receive information that includes at least metadata 122 and a corresponding suspicious object 120 for malware analysis (block 500). Prior to forwarding the metadata 122 to the first subsystem 130, a sensor (e.g., sensor $110_1$) may complete its enrollment as an initial analysis logic for a customer of the malware detection system 100. This enrollment scheme includes the subscription review service 170 of the malware detection system 100 receiving a license request message from a customer via a sensor or another network device (e.g., subscriber management system, endpoint device via the portal, etc.). The license request message may include the Sensor_ID 115 and/or credentials 116, which are received as part of the activation code 117 from the portal server (block 502).

In response to granting of the license request, without any human interaction, the subscription review service 170 stores the service policy level information 127 associated with the customer and returns or redirects at least a portion of the service policy level information 127 to the sensor or another network device with subsequent loading into the sensor (blocks 504 and 505). The service policy level information 127 include at least the URL for accessing the cloud broker 610 of FIG. 6A. This URL is used by the sensor to access the analysis selection service 140 within the malware detection system 100 while other data, such as the Sensor_ID 115 and/or Customer_ID 128, provided in the service policy level information 127, enables the cloud broker within the analysis selection service 140 to gain access to the subscription information 177 of FIGS. 1A-1B.

The analysis selection service 140 utilizes both the cluster selection values 157 and the subscription information 177, recovered the Customer_ID 128 provided as part of the service policy level information 127 and/or the Sensor_ID 115, to establish a communication session (e.g., tunnel) between the sensor (e.g., sensor $110_1$) and a selected cluster (e.g., cluster $185_1$) of the second subsystem 160 (blocks 510, 515, 520, 525 & 530). Herein, the subscription information 177 provides the analysis selection service 140 with customer selected performance and system operability requirements while the cluster selection values 157 provide information pertaining to the health of the clusters and/or compute nodes of the system.

As illustrated examples, the cluster selection values 157 relied upon for selection of the cluster (and/or compute node within the selected cluster) may pertain to values that collectively identify, when applied to policy and routing rules of the rules engine 142, what cluster or clusters have sufficient resources to support additional data submissions from a sensor. For example, the cluster selection values 157 may include values directed to cluster capacity and capabilities, including workload. The cluster workload may be determined based, at least in part, on utilization levels of each of the compute nodes (e.g., compute nodes $750_1$-$750_P$ of FIG. 7) within that cluster (e.g., cluster $185_1$). The cluster capacity may be based, at least in part, on current data (e.g., the distributed queue size for each cluster $185_1$-$185_N$ along with its current queue length (i.e., amount of queue (i.e., number of queue entries) that is not storing pertinent metadata) and/or historical data (e.g., cluster or node percentage utilization over a selected period of time). Additionally, or in the alternative, the cluster selection values 157 may include values directed to software profiles or geographic location of the sensor and/or cluster and/or other cluster capabilities that, when applied by the rules engine 142, may be used to determine which cluster or clusters is best suited for supporting the sensor (e.g., clusters that are geographically close to the sensor may be preferred for reduced transmission latency or legal requirements such as privacy regulations) and/or best satisfy the service attributes applicable to the subscriber's information.

The sensor (e.g., sensor $110_1$) receives incoming information for malware analysis. Specifically, the metadata extraction logic 270 of the sensor $110_1$ separates the metadata 122 from the object 120. Thereafter, the preliminary analysis logic 260 conducts an analysis of incoming traffic to determine whether the object 120 is suspicious (e.g., meets or exceeds a first threshold that the object 120 is associated with a cyber-attack). This preliminary analysis may include one or more checks (real-time analyses) being conducted on the metadata 122 and/or object 120 without execution of the object 120. Illustrative examples of the checks may include, but are not limited or restricted to the following: (i) bit pattern comparisons of content forming the metadata 122 or object 120 with pre-stored bit patterns to uncover (a) deviations in messaging practices (e.g., non-compliance in communication protocols, message formats, and/or payload parameters including size), (b) presence of content within the object 120 that is highly susceptible to or widely used by perpetrators for cyber-attacks, and/or (c) prior submission via the sensor $110_1$ of certain types of objects, and/or (ii) comparison between a representation of the object 120 (e.g., bit pattern representation as a hash of the object 120 or portions of the object 120) and stored representations of previously analyzed objects.

Prior to conducting an analysis to determine whether the object 120 is suspicious, it is contemplated that the preliminary analysis logic 260 within the sensor $110_1$ may determine whether a prior preliminary (or in-depth malware) analysis has been conducted on the object 120. Upon detecting a repeated malicious object, the sensor $110_1$ may issue an alert to the subscriber management system 118 or a network device selected by the customer. Also, the sensor $110_1$ may report the results from the prior analysis to the subscriber management system 118 or a network device. Upon detecting a repeated benign object, the sensor $110_1$ may discontinue further analysis of the object 120. However, where the object 120 is an URL or another object type, especially an object with dynamically changing data as in URLs or documents with an embedded URL, the sensor $110_1$ may routinely supply the metadata 122 to its assigned broker compute node via the analysis selection service 140.

Herein, the metadata 122 may be an aggregate of metadata retrieved from the incoming data 235 of FIG. 2 along with additional metadata associated with the sensor $110_1$ itself. The metadata 122 is provided to one of the broker compute nodes (e.g., compute node $300_1$) of the cluster $185_1$ that is assigned by the analysis selection service 140 to conduct an in-depth malware analysis of a suspicious object to be subsequently submitted by the sensor $110_1$ (block 535). A portion of the metadata 122 may be used by an analytic compute node to retrieve the suspicious object 120 associated with the metadata 122 for processing within a virtual machine, monitoring behaviors of the object (and virtual machine) during such processing, and determining whether the object may be malicious based on these monitored behaviors (blocks 540 and 545). The analysis results may be returned to the sensor $110_1$ via the analysis selection service 140 or provided to management system, portal or mobile as selected by the customer (block 550). Metadata associated with this analysis (e.g., Sensor_ID 115 that requested analysis, cluster workload, object type, etc.) and other analyses may be collected by the cluster management system 190 for use by the analysis monitoring service 145 to assist the analysis selection service 140 in cluster assignment to sensors $110_1$-$110_M$ and in subscription enforcement as described above (block 555).

VI. Details of Operational Flow

Referring now to FIG. 6A, a more detailed embodiment of the operational flow in establishing communications between sensors $110_1$-$110_M$ and the malware detection system 100 of FIGS. 1A-1B is shown. According to this embodiment of the disclosure, the analysis selection service 140 of the first subsystem 130 includes a cloud broker 610 that is communicatively coupled to the system monitoring logic 630, which may be located in the analysis selection service 140 (see FIG. 7) or the analysis monitoring service 145 as shown in FIG. 6A. The architecture of the cloud broker 610 and the system monitoring logic 630, either individually or collectively, may include one or more hardware processors and memory including software modules that, when executed, performs their functionality described below. Alternatively, the cloud broker 610 and/or the system monitoring logic 630 may be deployed as the software modules that, upon execution by a hardware processor, perform the functionality described herein.

The second subsystem 160 features subscription review service 170, which may include licensing logic 640 along with enrollment logic 650 and security content updating logic 670. It is contemplated that the licensing logic 640, enrollment logic 650 and the security updating logic 670 may be configured as a collective grouping at the same location or may be geographically distributed. In accordance with one embodiment of the disclosure, the architecture of the subscription review service 170 may include licensing logic 640 along with enrollment logic 650 and security content updating logic 670 being software modules with functionality (described herein), which are stored in memory and executed by one or more hardware processors. Additionally, the object evaluation service 180 of the second subsystem 160 includes one or more clusters $185_1$-$185_N$, and/or cluster management system 190 to manage the organization of the cluster(s) $185_1$-$185_N$ and the configuration of the compute nodes (not shown) deployed within the clusters $185_1$-$185_N$. The architecture of the cluster management system 190 may be implemented as a network device that includes one or more hardware processors and memory including software that, when executed, performs its functionality described below. However, as alternative embodiments, the subscription review service 170 and/or some or all of the object evaluation service 180, including the cluster management system 190, may be deployed as software that is executed by the same or different hardware circuitry deployed within the second subsystem 160.

The sensors $110_1$-$110_M$ may be positioned at various locations on a transmission medium 602 that may be part of an enterprise network 600 (e.g., connected at various ingress points on a wired network or positioned at various locations for receipt of wireless transmissions). For an email threat detection embodiment, for example, a sensor (e.g., sensor $110_2$) may be incorporated in a message transfer agent deployed in-line with the email traffic flow and between an anti-spam gateway and a network's internal mail server (e.g., Microsoft Exchange®). For use in a deployment involving a cloud-based messaging service, the email may be delivered to the sensor $110_2$ as a next-hop before the email reaches the internal mail server. Alternatively, the sensor $110_2$ may be included as part of the anti-spam gateway or the internal mail server.

As shown in FIG. 6A, located at subscriber site 112, each sensors $110_1$-$110_M$ deployed as a physical or virtual sensor is configured to monitor data traffic propagating over a network, such as the enterprise network 600 for example. The "traffic" may include an electrical transmissions as files, email messages, web pages, or other types of content. Each sensors $110_1$-$110_M$ is communicatively coupled to the subscriber management system 118, which is responsible for managing operability of the sensors $110_1$-$110_M$.

More specifically, according to one embodiment of the disclosure, the sensor $110_1$ may be implemented as a network device or deployed as software within a network device. The sensor $110_1$ is either coupled to the transmission medium 602 directly or coupled to the transmission medium 602 via a data capture device 604. According to this embodiment, the data capture device 604 is configured to receive incoming data and subsequently process the incoming data, as described below. For instance, the data capture device 604 may operate as a network tap with mirroring capability, which provides to the sensor $110_1$ at least one or more data submissions 124 acquired from network traffic propagating over the transmission medium 602. Alternatively, the data capture device 604 may operate as a port for receiving data submissions 124 provided via a suitable dedicated communication link or from portable storage media such as a flash drive. Furthermore, although not shown, the sensor $110_1$ may be configured as an in-line appliance to receive traffic (e.g., files or other objects) and to provide data submissions 124 that are associated with "suspicious" objects for subsequent analysis.

It is contemplated that the security content updating logic 670 may be communicatively coupled to a cybersecurity vendor (not shown) to receive software updates and/or data (e.g., component) updates for distribution to (i) the cluster management system 190 via a first transmission medium 672 and (ii) the subscriber management system 118 via a second transmission medium 673. The cluster management system 190 is configured to manage a cluster or multiple clusters of the object evaluation service 180 while the subscriber management system 118 is configured to manage a sensor or multiple sensors of the subscriber site 112, as shown.

As an illustrative example, updates to the functionality of components within the object evaluation service 180 (e.g., signatures, rules, executables, software patches, OS versions, plug-ins, etc.) may be propagated to the compute nodes $300_1$-$300_P$ via the cluster management system 190, which received the updates from the security content updating logic 670 via the first transmission medium 672. Similarly, updates to the functionality of components within the sensors (e.g., sensors $110_1$-$110_M$) may be propagated via the subscriber management system 118, which received the updates from the security content updating logic 670 via the second transmission medium 673. Furthermore, the security content updating logic 670 supports two-way communications to receive and share information associated with analysis results conducted by sensors or clusters of the malware detection system 100 via communication path 674 and/or analysis results from other sources outside of the malware detection system 100 such as a cybersecurity intelligence vendor via communication path 675.

A. Licensing and Enrollment

Referring now to FIG. 6A, to obtain access to the malware detection system 100, the sensor $110_1$ may require a software license that includes software license (subscription) credentials 116 to allow the sensor $110_1$ to communicate with the enrollment logic 650. To secure these credentials 116, a customer may register (subscribe) to services offered by the malware detection system 100 via a network device (e.g., using input/output "I/O" interface 606 with web browser functionality at the subscriber management system 118, an endpoint device 608 coupled to the network 600, or network device 609). Upon completing registration, the portal 165 provides the activation code 117, including at least the credentials 116 (along with the Sensor_ID 115 to be loaded onto any virtual sensors), to the network device used in the registration process or any network device selected by the customer during registration (including the sensor $110_1$). Additionally, the portal 165 stores the registration information 167 provided by the customer as part of the subscription information 177.

In some embodiments, the customer may be offered a plurality of subscriptions (types and/or tiers). Different subscription types may focus on different cybersecurity protection points (e.g., email, network traffic, file system, etc.) while the subscription tiers may correspond to different service performance levels as specified by a set of subscription attributes. For instance, one subscription attribute may specify a specific duration (or latency) allocated for analyzing an object by the malware detection system 100 before the analysis time-out occurs and for classifying the object as malware or benign. Another subscription attribute may specify a maximum number of customer endpoint devices, e.g., laptops and other computers to be supported and protected against cyber-attacks by the malware detection system. Yet another subscription attribute includes a number and/or rate of data submissions allowed for the subscription tier selected. The subscription attributes may be included as part of the subscription information 177.

Moreover, the customer may also have an opportunity to select (e.g., via the portal 165 by the I/O interface 606 or the endpoint device 608) from among a set of customer-configured attributes which, though not dictated by the subscription type or tier, once selected, become associated with the subscription. The customer-configured attributes may be used in managing the selection of cluster(s) within the object evaluation service 180. These customer-configured attributes may include, by way of example, (i) a geographic location attribute that specifies the customer's preferred or required geographic location for the cluster used to analyze submission data from the customer, e.g., to protect sensitive information, and (ii) a guest image attribute that specifies one or more software profiles (e.g., brand and/or version of computer programs included in the software profiles) preferred or required by the customer.

As described, the subscriber management system 118, when equipped with the interactive I/O interface 606, permits examination of subscriber site or customer statistics on a per sensor basis rather than at a customer-aggregated level. This allows for selection or allocation of different attributes on a per-sensor basis. As an illustrative example, traffic/objects from a sensor (e.g., sensor $110_1$) serving the finance department of a customer may have a lower threshold of suspiciousness, be entitled to a higher bandwidth of analysis (e.g., greater number of submissions per day, week or month) by the malware detection system 100 than traffic/objects from other departments, where the average bandwidth of analysis across all sensors for the customer still meets the subscription level and other attributes. As another example, the customer can customize malware detection on a per-sensor basis, where a sensor $110_M$ is located at a different geographic reason to protect a subnet different than the subnet protected by the sensor $110_1$. These sensors $110_1$ and $110_M$ may feature different guest image software profiles, and thus, the attributes associated with the sensor-based subscription may vary from sensor to sensor. In some embodiments, the per-sensor customization can be performed at the portal's interactive user interface 606 rather than or in addition to that of the subscriber management system 118, in which case the customer's "entries" can be communicated to the subscriber management system 118 for informational/reporting purposes and for compliance monitoring/enforcement. The portal 165 can also store the customer's per-sensor configuration selections as part of the subscription information 177.

Figure 6B:
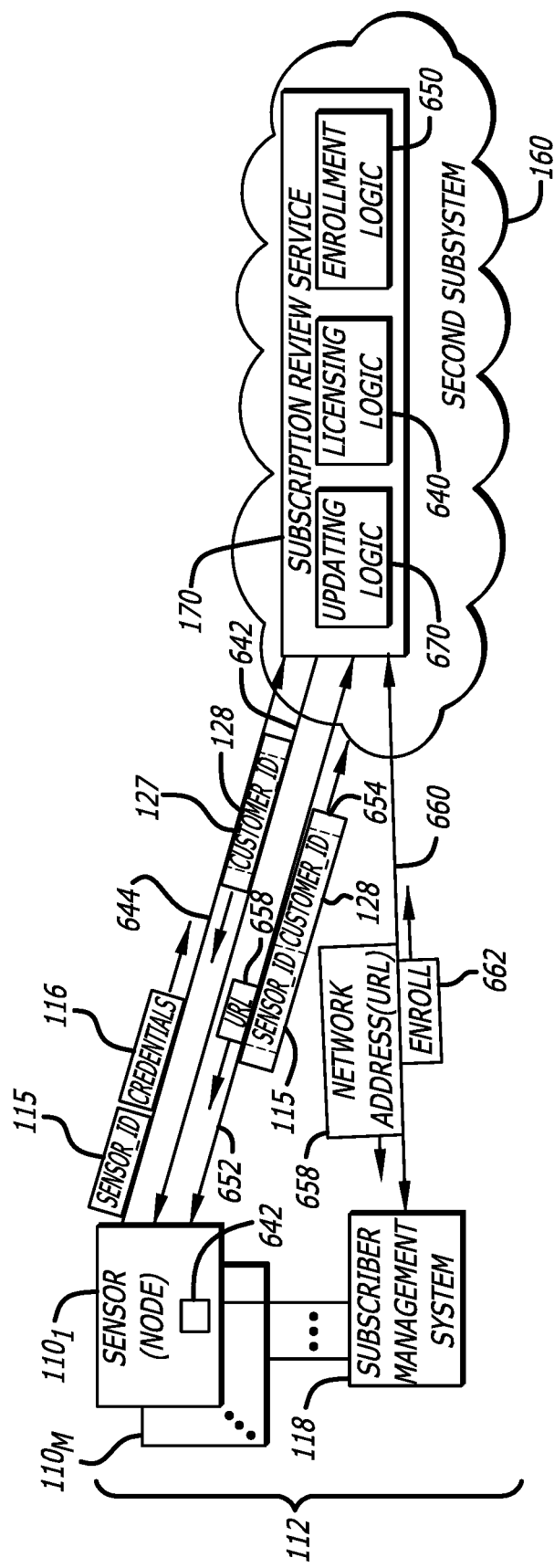
FIG. 6B is an embodiment of the operational flow between the sensors and the subscription review service of FIG. 1A.

According to one embodiment of the disclosure, as shown in both FIG. 6A and FIG. 6B, the Sensor_ID 115 and credentials 116 provided during registration are stored in the sensor $110_1$ to allow the sensor $110_1$ to communicate with the licensing logic 640. Hence, the sensor $110_1$ may acquire the software license credentials 642 by transmitting one or more license request messages 644 to licensing logic 640. The license request message(s) 644 may include information uniquely associated with the sensor $110_1$. Additionally, the license request message(s) 644 may include the Sensor_ID 115, the credentials 116, and information associated with the customer and/or financial information to purchase the software license to supplement information provided during registration via the portal 165. The software license credentials 642 includes the service policy level information 127, which includes at least the Customer_ID 128 along with any credentials necessary to communicate with the enrollment logic 650.

After receipt of the software license credentials 642, to enroll for access to the malware detection system 100, the sensor $110_1$ establishes a communication session with the enrollment logic 650 over a communication link 652. During this communication session, as shown in FIG. 6B, the enrollment logic 650 receives an enrollment request message 654, which includes at least the Sensor_ID 115 and/or the Customer_ID 128. Based on this information, the enrollment logic 650 authenticates the sensor $110_1$ through use of a directory (e.g., LDAP lookup), and upon authentication, returns to the sensor $110_1$ a network address 658 (e.g., URL) for accessing the cloud broker 610 of FIG. 6A. The enrollment logic 650 may generate a mapping between Sensor_IDs, Customer_IDs and attributes associated with the subscription for storage within the subscription information 177.

As represented in FIG. 6A by transmission medium 659, the enrollment logic 650 may be communicatively coupled to the cloud broker 610 to directly provide an array of attributes associated with the subscribed customer and/or enrolled sensor $110_1$ to a local memory accessible by the cloud broker 610. The cloud broker 610 accesses these attributes, which are stored as part of the subscription information 177, and considers these attributes when assigning a cluster to handle malware analyses on objects provided by the enrolled sensor $110_1$ (e.g., selection of the cluster may be based on sensor location; sensor assigned QoS threshold; customer subscription level; etc.).

Besides subscription attributes, the attributes may include factory set attributes, customer configurable attributes provided via (i) a command line interface (CLI), (ii) a web-browser based interface offered by the sensor $110_1$ or the subscriber management system 118, or (iii) the portal 165 (e.g., customer console). Additionally, one or more attributes (operational attributes) may be generated dynamically during operation of the malware detection system, for example, an attribute may specify aspects of a history of communications (e.g., email or web downloads; number or rate of data submissions for in-depth analysis) with the sensor 110₁, where the history may assist in the selection of the cluster for the enrolled sensor 110₁.

As a result, as shown in FIG. 6A, the sensor 110₁ may establish communications with the cloud broker 610 through transmission of the analysis request message 125 which, in turn, prompts the cloud broker 610 to establish the communication session over the communication link 155 with the selected broker compute node (e.g., broker 300₁). Thereafter, the sensor 110₁ may provide a data submission 124 (including at least metadata 122) to commence analysis of the object 120 associated with the metadata 122. Of course, in the event that the sensor 110₁ has not been authenticated via the enrollment logic 650, no data submissions by the sensor 110₁ are forwarded by the cloud broker 610 to a selected cluster (e.g., cluster 185₁) for processing.

Alternatively, in accordance with a second embodiment of the disclosure as shown in FIG. 6B, in lieu of a sensor directly interacting with the malware detection system 100 for enrollment, the subscriber management system 118 may be configured to indirectly enroll a sensor (e.g., sensor 110₁). Communicatively coupled to the sensor 110₁-110_M, the subscriber management system 118 monitors and/or controls operability of the sensor 110₁-110_M. In response to a triggering event occurring for sensor 110₁, the subscriber management system 118 establishes a communication session 660 with the enrollment logic 650 on behalf of the sensor 110₁. As described above, via the subscriber management system 118, the enrollment logic 650 authenticates the sensor 110₁, where the authentication may include confirming that the sensor 110₁ features an active license to the malware detection system 100. Such confirmation may be accomplished by, after receipt of an enrollment request message 662 via the subscriber management system 118 by enrollment logic 650, determining that the message 662 includes information stored in a database in the enrollment logic 650 that identifies the sensor 110₁ and/or the customer associated with the sensor 110₁ (e.g., Customer_ID, username, and/or keying material associated with the sensor 110₁). Upon authentication of the sensor 110₃, the URL 658 is acquired by the enrollment logic 650 and provided to the sensor 110₁ via the subscriber management system 118.

B. Data Submission

Referring back to FIG. 6A, after successful enrollment, the sensor 110₁ establishes the communication session via communication link 612 with the cloud broker 610 (illustrated separately from signaling that establishes the session 612). In particular, the sensor 110₁ transmits an analysis request message 125 to the cloud broker 610, which operates as a proxy on a per sensor basis. As one embodiment, the analysis request message 125 may include at least the Sensor_ID 115, and perhaps some or all of the service policy level information 127 (e.g., Customer_ID 128, or perhaps the assigned subscription tier or QoS threshold).

According to one embodiment of the disclosure, the Sensor_ID 115 and/or the Customer_ID (if provided) may be used by the cloud broker 610 to access certain attributes associated with the subscription selected by the customer. These attributes, along with the cluster selection values 157, namely a portion of the operational metadata 150 or information produced based at least in part on a portion of the operational metadata 150, is used in selecting a cluster (e.g., cluster 185₁) and a broker compute node of the cluster 185₁ (e.g., broker compute node 300₁) to control the handling of malware analyses for the sensor 110₁. Thereafter, from the sensors 110₁, the Sensor_ID 115 is passed with the metadata 122 to the selected broker compute node 300₁.

According to one embodiment of the disclosure, the object evaluation service 180 (e.g., cluster management service 190 on behalf of the broker compute node 300₁) may use the Sensor_ID 115 to retrieve at least a portion of the subscription information 177 (e.g., subscription tier, QoS threshold, permissions, access control information, and/or cluster availability details). The portion of the subscription information 177 may be used by the broker compute node 300₁ (or passed to the cluster management system 190) to verify operations by the customer and the cluster 185₁ are compliance with the customer subscription. Also, the portion of the subscription information 177 may be used by the broker compute node 300₁ to prioritize (compute a priority in the handling of) the metadata 122 over some other metadata representing objects in the queue 310. Such prioritization may be accomplished by assigning tags to the metadata 122 to denote priority, assigning higher priority metadata to different locations within the queue 310 or different queues, or the like.

In this example, both the Sensor_ID 115 and the metadata 122 may be stored within the distributed queue 310 and subsequently removed from the queue 310 by one of the compute nodes 300₁-300_P for use (if needed) in retrieval of the corresponding object 120 for analysis. The Sensor_ID 115 may further accompany the malware analysis results of the object 120, which are returned from the cluster 185₁ to the cloud broker 610. A mapping between Sensor_IDs and their corresponding Customer_IDs is accessible to the cloud broker 610 via the data store(s) 175 within or separate from the subscription service 170, as described above. Customer-configured attributes for the customer (learned from the Sensor_ID-to-Customer_ID mapping) may be accessed to identify the selected network device(s) to receive the malware analysis results.

Additionally, as another embodiment of the disclosure, a portion of the service policy level information 127 may be used in controlling operation of the object evaluation service 180, such as selecting a cluster to handle malware analyses for the sensor 110₁ and/or assigning priority in the handling of metadata 122 (and corresponding object 120) according to the subscription tier assigned to the customer. For this embodiment, the Customer_ID 128 may be used by the object evaluation service 180 (e.g., cluster management service 190 on behalf of the broker compute node 300₁) in retrieving, from the subscription review service 170, at least the portion of the subscription information 177 assigned to the customer with the Customer_ID 128.

According to yet another embodiment of the disclosure, it is contemplated that the Customer_ID 128 is not forwarded to the selected cluster 185₁. Rather, using the Sensor_ID 115 or the Customer_ID 128 as a lookup parameter, the cloud broker 610 may be configured to access one or more data stores 175 within the malware detection system 100 (e.g., within the first and/or second subsystems) to collect a portion of the subscription information 177 that may influence cluster selection. Examples of the subscription information 177 may include, but are not limited or restricted to the subscription tier value, QoS threshold(s) based on the subscription level; cluster availability based on the subscription level (e.g., the default cluster for the subscription, cluster selection ordering or preferences if the default cluster is unavailable or is unable to satisfy the QoS threshold(s), cluster restrictions, etc.); geographic location permissions or restrictions for compute nodes associated with the selected cluster; remediation setting (e.g., type of remediation) set for the customer; or any other attribute(s). A portion of this subscription information 177 accompanied by the metadata 122 is provided to the selected broker compute node $300_1$ and may be used to prioritize handling of the metadata 122.

Referring still to FIG. 6A, the system monitoring logic 630 is communicatively coupled to the cloud broker 610 of the first subsystem 130 and the cluster management system 190 of the second subsystem 160. Configured to provide the cloud broker 610 with sufficient visibility of cluster and/or sensor operability, the system monitoring logic 630 collects, on a periodic or aperiodic basis, the operational metadata 150 from the cluster management system 190. Thereafter, the system monitoring logic 630 provides the cloud broker 610 with either access to a portion of the operational metadata 150 or with cluster selection values 157 that can be based on at least portions of the operational metadata 150 representing the operability and availability of the clusters $185_1$-$185_N$ hosted by the object evaluation service 180. The cloud broker 610 utilizes the portion of the operational metadata 150 (or the cluster selection values 157) along with attributes from the subscription information 177 in selecting at least one of the clusters $185_1$-$185_N$ to receive data submissions 124 from the sensor $110_1$.

The system monitoring service 630 operating in concert with the cluster broker 610 may be configured to assure that the malware detection system 100 (and specifically the clusters and compute nodes available to perform object evaluation services) are capable of satisfying the service requirements (and, where provided, performance guarantees) of all customers. By evaluating the operational metadata 155 provided by the cluster management system 190 for all clusters against customer subscription information from the subscription review service regarding all customer registrations (and/or sensor enrollments for object evaluation services), the cluster broker 610 (and/or the system monitoring service 630) may generate system status information indicating the overall capacity and capability of the malware detection system to service all the registered customers per their aggregated service level requirements. The cluster broker 610 (and/or the system monitoring service 630) provides the system status information to system administrators by generating and sending status reports and alerts on demand and/or as system conditions require.

According to one embodiment of the disclosure, the cluster selection values 157 may be based on operational metadata 150 that may be categorized as cluster-based operational metadata, customer-based operational metadata and CN-based operational metadata. In general, the cluster-based operational metadata includes data representing the availability of each cluster $185_1$-$185_N$ to analyze an incoming object for malware. The customer-based operational metadata and CN-based operational metadata are directed to measured data in accordance with subscriber (customer) and compute node based granularity. Examples of the cluster-based operational metadata, customer-based operational metadata and CN-based operational metadata included as parts of the operational metadata 150 include the following:

Cluster-Based Operational Metadata:

Operational information regarding the cluster(s), including (i) workload (e.g., cluster workload or utilization level, etc.); (ii) location (e.g., cluster geographic location, etc.); (iii) configuration (e.g., software profile(s) supported by cluster, etc.); and/or (iv) storage capacity (e.g., queue size for use in storage of metadata awaiting processing to prompt fetching of the corresponding object, etc.).

Customer-Based Operational Metadata:

Operational information regarding the customer(s) or one or more of the sensors of the customer(s), including: (i) submission rate (e.g., number of objects submitted (per sensor or per subscriber) over a given time period or other aggregate, rate of submission over a given time period such as number of objects submitted" divided by "given time period," etc.); (ii) submission type (e.g., types of objects submitted (per sensor or per subscriber) over a given time period or other aggregate, etc.); and/or (iii) detection rate (e.g., number of submitted objects determined as potentially malicious by a cluster over a given time period or other aggregate, etc.).

CN-Based Operational Metadata:

(i) node workload (e.g., workload or utilization level of a particular compute node "CN", etc.); (ii) location (e.g., geographic location of the particular CN, etc.); (iii) configuration (e.g., software profile(s) supported by the particular CN, etc.); and/or (iv) rate of submission (e.g., "number of objects" divided by "given time period" by the particular CN).

It is contemplated that the architecture of the system monitoring logic 630 may be further configured to receive a portion of the subscription information 177 (e.g., customer-configured attributes), which may cause weighting of certain cluster selection values 157. For instance, as an illustrative example, where customer-configured attributes identify that the customer has selected only compute nodes featuring a certain software profile for analysis of submitted objects for malware, the system monitoring logic 630 may adjust the cluster selection values 157 to cause the rule engine 142 to eliminate any clusters that do not feature computer nodes with the certain software profile. Additionally, or in the alternative, compute node selection may be at least partially performed automatically (without customer input) based on at least a portion of the service policy level information 127 (e.g., Customer_ID), which may restrict or enlarge the types of compute nodes or groupings of compute nodes based on subscription level, geographic location based on the location of sensor having the object for submission, etc.).

In order to ensure compute node configurability, the system monitor logic 630 may be configured to provide cluster selection values 157 that include metadata used by the cloud broker 610 to control what compute node or compute nodes are permitted to process submitted objects from a particular subscriber. For instance, this metadata (e.g., subsequently included as part of the metadata 122 as illustrated in FIG. 1B), may signal the cloud broker 610 to appropriately tag the metadata 122 prior to transmission to a targeted broker compute node (e.g., broker compute node $300_1$) of a selected cluster for temporary storage in the cluster queue 310. The tag may be used to identify preferred or requisite compute nodes (or group of compute nodes) for recovery of the metadata 122 for subsequent retrieval of a corresponding object for malware analysis. As briefly described above, each compute node (e.g., compute $300_1$), when accessing the cluster queue 310 to retrieve metadata, may scan the queue 310 for a prescribed time or prescribed "L" number of entries (e.g., $10 \geq L \geq 2$). The scanning is performed to determine whether any of the queued metadata is targeted for exclusive handling by that compute node $300_1$ (or a group of which the compute node is a member). If so, the compute node $300_1$ may retrieve that metadata thereby deviating from a first-in, first-out (FIFO) queue retrieval scheme.

The FIFO retrieval scheme may be the default retrieval scheme for all compute nodes (e.g., compute node $300_1$-$300_P$) in a cluster (e.g., cluster $185_1$) in some embodiments. In such embodiments, upon completing processing of an object, the compute node $185_1$ simply retrieves the metadata of the next entry in the queue 310 that remains unprocessed and available for processing by a compute node. In other embodiments that are equipped to provide certain subscribers premium service with reduced latency, each of these compute node(s) may seek to next process an entry tagged to identify the metadata being provided from premium service customers. For example, these compute node(s) may check for the next tagged entry in the queue 310 for data submissions from premium service customers, and process that entry. In some embodiments, the compute node(s) may check only the next "Q" entries in the queue 310, where the number "Q" is a positive integer (e.g., Q≤10), and if such an entry is not found, returns to retrieval of the metadata through a FIFO scheme by default so as to select the least recent (top) available entry.

Upon receipt of the cluster selection values 157, the cloud broker 610 is better able to select a cluster (e.g., cluster $185_1$) from the cluster $185_1$-$185_N$ for handling analyses of objects from the sensor $110_1$. The selection of the cluster (e.g., cluster $185_1$) may be based, at least in part, on the cluster selection values 157 and/or portions of subscription information 177 made available by content within the analysis request message (e.g., service policy level information 127), which are applied by the policy and routing rules processed by the rules engine 142 within the cloud broker 610 (see FIG. 7). Stated differently, the cluster selection values 157 provided from the system monitoring logic 630 and/or attributes from the subscription information 177 (for the customer seeking access to the cluster $185_1$-$185_N$) are made available to the rules engine 142 running the policy and routing rules on the cloud broker 610. Upon selection of the cluster $185_1$, a communication session (e.g., tunnel) over the communication link 155 is established between the cloud broker 610 and one of the broker compute nodes within the cluster $185_1$ for receipt of data submissions from the sensor $110_1$.

Additionally, in lieu of the first enforcement logic 143, another type of logic, namely the policy and routing rules controlling operations of the cloud broker 610, may be designed to confirm compliance with one or more performance and/or operation thresholds for the selected subscription level by comparing values associated with certain cluster selection values 157 (or operational metadata 150) to values associated with certain attributes within the subscription information 177. In response to determining that the operability of the cluster $185_1$ is not compliant with certain thresholds established by attributes for the subscription selected by the customer (e.g., failure to satisfy a prescribed number of performance thresholds or a particular performance threshold, number of submissions exceeds a prescribed maximum, etc.), the cloud broker 610 may issue an alert to the sensor $110_1$, subscriber management system 118, or another network device (e.g., endpoint device 608, etc.) regarding detected non-compliance.

Different types of alerts may be provided. For instance, a first alert may include a message sent to a subscriber management system 118 or an endpoint device 608 controlled by an administrator of the customer's network. The alert may identify one or more attributes that fail to satisfy criterion set by certain subscription information e.g., criteria associated with certain service attributes. In some cases, non-compliance may be remedied by adjusting the current subscription to increase entitled object processing capacity. For example, where the subscription tier qualifies or permits the customer to submit a maximum number of objects or transmit at a maximum rate for analysis, the first alert may notify the customer administrator that the number or rate has been exceeded, and the customer is notified to increase this factor of the subscription accordingly to address non-compliance.

Besides a first alert, a second alert (message) may be provided to an OEM (or another party) hosting the object evaluation service 180 identifying a performance issue causing non-compliance. In response to the second alert, the OEM (or another party) may provide a remedy by augmenting the selected cluster with more compute nodes or re-balancing workloads on the existing clusters/compute nodes (e.g., readjustment of sensor/cluster pairing, activating a cluster or compute node in a particular geographic location, etc.). Of course, the selected remedy may depend on what attributes have not been satisfied in accordance with the current subscription.

As an illustrative example, the policy and routing rules of the rules engine 142 may be coded to select from a certain subset of clusters (e.g., clusters $185_1$-$185_2$), numbering less than the available clusters (e.g., e.g., clusters $185_1$-$185_5$), based on subscription information retrieved using the Sensor_ID 115 or a portion of the service policy level information 127 (e.g., Customer_ID 128) as described above. Additionally, the selection of a particular cluster (e.g., cluster $185_1$) from the subset of clusters (e.g., clusters $185_1$-$185_2$) may be based on an evaluation of cluster selection values 157 associated with each cluster of the subset of clusters. This evaluation may include (i) a comparison of the current workload of each cluster (e.g., cluster $185_1$ and cluster $185_2$) as represented by certain cluster selection values 157; (ii) a determination as to which cluster(s) of the subset of clusters (e.g., clusters $185_1$ or $185_2$) support a software profile needed to process the type of object for analysis (e.g., PDF reader application, word processing application, a web browser) or a software profile required by a particular customer as represented by other cluster selection values 157; and/or (iii) a determination of the geographic region in which each cluster of the subset of clusters ($185_1$ or $185_2$) is located, as represented by the subscription information 177 accessed using the Sensor_ID 115 or a portion of the service policy level information 127 (e.g., Customer_ID) as a reference. It is contemplated that the ordering (or weighting) for some or all of these rules may vary for different versions of the policy and routing rules of the rules engine 142.

Besides issuing alerts upon determining that the operability of the cluster $185_1$ is not compliant with certain thresholds established by attributes for the subscription selected by the customer, a communication session with the effected sensor $110_1$ may be terminated for load-balancing purposes. According to one embodiment of the disclosure, the communication session established via communication links 155/612 between the sensor $110_1$ and the cluster $185_1$ via the cloud broker 610 may remain active (and exclusive) until a session termination event has occurred. The session termination event may be detected by the sensor $110_1$ or logic within the analysis selection service 140, such as the system monitoring logic 630 and/or the cloud broker 610 for example.

For instance, according to one embodiment of the disclosure, a session termination event may occur in response to logic within the analysis selection service 140 determining, from the operational metadata 150 gathered by the cluster management logic 190, that termination of the communication session and reassignment of the current sensor/cluster $110_1/185_1$ pairings is needed to better ensure that service guarantees established by the subscription (i.e., identified by certain service attributes) are fulfilled. This session termination event may be caused, at least in part, by (a) changes in condition of the assigned cluster (e.g., health and operability of the cluster $185_1$); (b) changes in cluster availability where a cluster $185_N$ different than the assigned cluster $185_1$ is better suited to handle analyses (e.g., as new clusters come online or workload demands on clusters change); or (c) changes in customer requirements.

As an illustrative example, the reassignment may involve cluster load-balancing based on an analysis of cluster operability. Such analysis of cluster operability may involve (i) monitoring the number of timeouts that occur during the communication session $155/612$ between the sensor $110_1$ and the cluster $185_1$ and (ii) determining whether the number of timeouts exceeds a timeout threshold. The timeout threshold may be a uniform value or a value that is based, at least in part, on the customer's subscription (e.g., lower timeout thresholds for higher subscriptions tiers or a customer-configured attribute). Hence, upon exceeding the timeout threshold (once or over a prescribed period of time), which signifying that the cluster $185_1$ is currently unable to adequately support the data submissions level provided by the sensor $110_1$ (session termination event), a readjustment of one or more cluster/sensor pairings may occur. More specifically, the sensor $110_1$ may be re-assigned to a different cluster (e.g., cluster $185_N$) or other sensors in communications with the cluster $185_1$ (e.g., sensor(s) at lower subscription tiers) may be re-assigned to a different cluster (e.g., cluster $185_2$) to reduce cluster workload.

It is contemplated that, to perform the reassignment substantially in real-time, measures need to be undertaken to address incoming data submissions and metadata currently residing in the cluster queue. As an illustrative example, incoming data submissions could be temporarily buffered at the sensor $110_1$ or at the analysis selection service 140 while another communication session is being established between the sensor $110_1$ and another cluster $185_2, \ldots,$ or $185_N$. Prior to or concurrently with the buffering of the incoming data submissions involving the sensor $110_1$, the queued metadata from the sensor 115 may be returned to the sensor $110_1$ or the analysis selection service 140, temporarily buffered, and resubmitted to the reassigned cluster $185_N$.

Other illustrative examples of session termination events for readjustment of the sensor/cluster pairing may include, but are not limited or restricted to the following: (1) geography restrictions (e.g., new cluster closer in proximity to customer); (2) health issues (e.g., compute node failures, environmental conditions in one geographical location to shut down and causing clusters at another geographic location to temporarily handle the increased workload); (3) resizing of the individual clusters (e.g., higher number or fewer number of compute nodes available within cluster); (4) capacity or other limits on subscription; (5) communication session 612 between the sensor $110_1$ and the cloud broker 610 remaining active beyond a prescribed period of time; or (6) scheduled maintenance (e.g., schedule non-use of the cluster within certain time frames along with a prescribed lead time or allow for "graceful" take-down of the cluster).

According to another embodiment of the disclosure, the malware detection system 100 may be configured without supporting real-time reassignment session termination event may occur in response to the sensor $110_1$ detecting that its local data store has no suspicious objects currently awaiting processing by object evaluation service 180. Responsive to detecting the empty local data store, the sensor $110_1$ may terminate the existing communication session 612 with the cloud broker 610.

Besides assigning a sensor to a particular cluster, the cloud broker 610 may be configured to output statistical information in response to the management query message. The statistical information is based on one or more portions of the operational metadata 150 and is included as part of reporting data 193. The reporting data 193 may be aggregated and displayed, by the endpoint device 608, subscriber management system 118 or another network device, in a manner that is directed to the operability of any customer (as the Customer_IDs may be cross-referenced to the Sensor_IDs) as well as any sensor, any cluster, or any compute node within one of the clusters.

C. Subscription Service Levels

The malware detection system 100 may offer differentiated subscription levels or tiers of service, managed by the cloud broker 610 and the broker compute nodes $300_1$-$300_i$ ($i \geq 1$) in association with the license/enrollment services (described above) or the authentication node (described below). According to one illustrative example, the cloud broker 610 (and/or a selected broker compute node $300_1$) can push all data submissions from sensors (and their corresponding subscribers who paid for this higher subscription level) to a high priority queue (an allocated part of queue 310) to handle the analysis of the data submission within a pre-agreed time allotment. In contrast, data submissions handled by a non-premium level of service (lower subscription level) are provided to a different "standard" queue. Alternatively, the cloud broker 610 (and/or a selected broker compute node $300_1$) can tag entries in the queue (not shown) as premium requests and the analytic computer nodes will process a number of premium requests before resuming with processing a standard request.

As another example, for different service subscriptions, the distributed queue 310 may be monitored by logic within the cloud broker 610 (e.g., first enforcement logic 143 described above), where the malware detection system may limit the total number of data submission per customer (subscriber site) per a prescribed time period (e.g., hour/day/week/month/year) based on the subscription. Alternatively, the malware detection system 110 may limit the data submissions based on a prescribed amount of content based on the level of service per the subscription (e.g., 1 gigabytes/second "GPS" of traffic for Tier 1 service level and 2 GPS for Tier 2 service level).

As yet another example, the data submissions from a certain customer (Customer_ID) or certain sensors (e.g., Sensor_ID) at subscriber sites 112 and/or 114 may be tracked by the cloud broker 610 (and/or selected broker compute node). Such tracking may be conducted where the customer is billed based on the overall usage of the object evaluation service 180. As a result, the level of subscription paid for by the customer may be used to set throughput thresholds, number of data submissions, and/or other SLA (service level agreement) attributes.

Also, the malware detection system may differentiate service level commitments based on the type of object, for example, URL analysis may be performed in a shorter time than file analysis. Alternatively, different clusters or analytic compute nodes within a single cluster can be dedicated to certain tiers of service or types of object analysis (URLs, email, files, webpages) that may consume more or less time to complete.

VII. Cloud Broker Architecture

Figure 7:
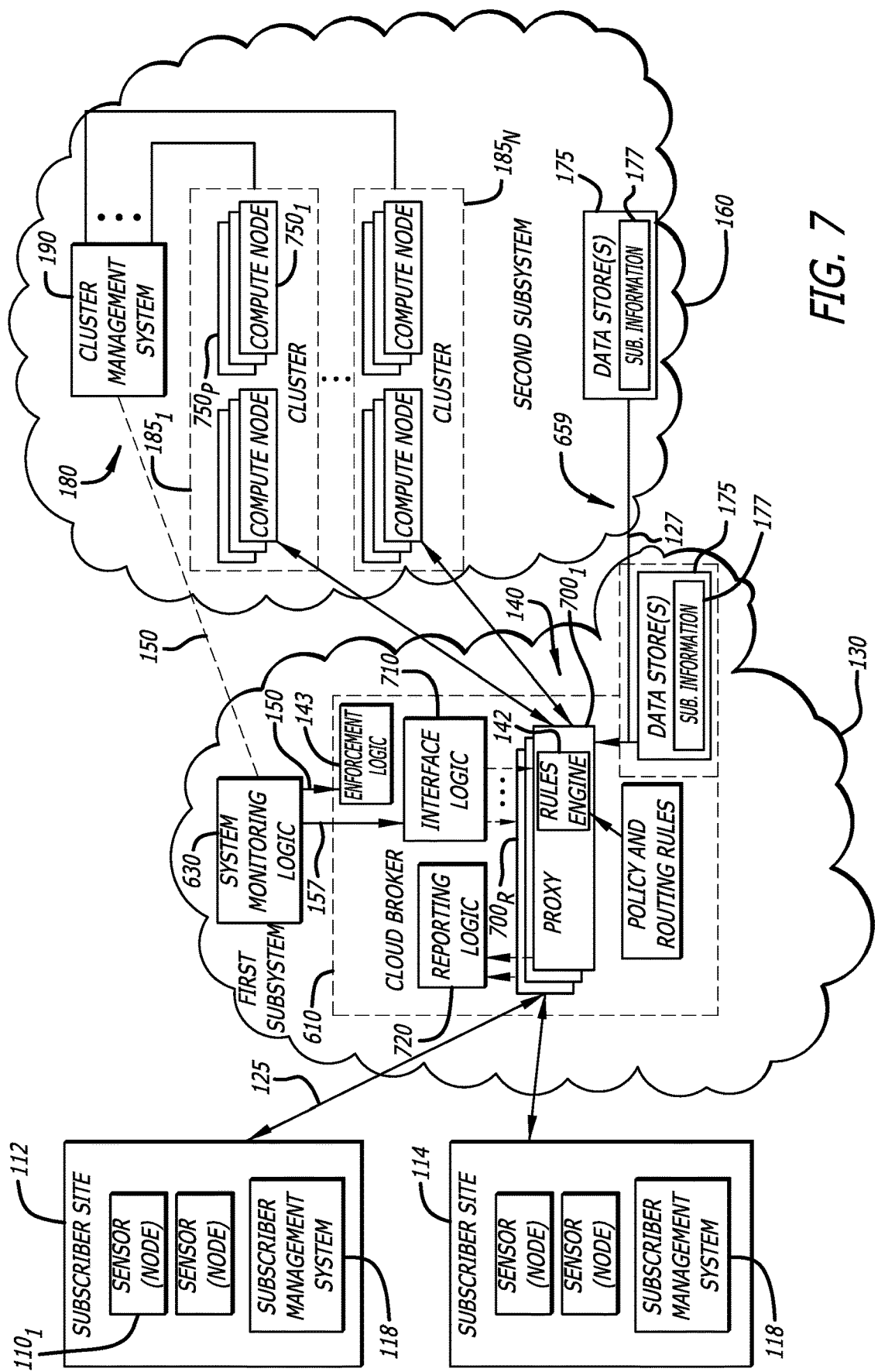
FIG. 7 is an exemplary embodiment of the analysis selection service of FIGS. 1A-1B, including the cloud broker and the system monitoring logic.

FIG. 7 is an exemplary embodiment of the cloud broker 610 being a portion of the logic implemented within the analysis selection service 140 of FIGS. 1A-1B. The cloud broker 610 offers centralized control of policy and routing decisions for object evaluation service 180 and a level of abstraction that precludes exposure of a particular broker compute node within the clusters $185_1$-$185_N$ to the sensors $110_1$-$110_M$. This level of abstraction may assist in compliance with certain outbound firewall rules at an enterprise network 600 of FIG. 6A that may require a single endpoint connection. According to this embodiment, the cloud broker 610 includes one or more proxy modules $700_1$-$700_R$ (R≥1), interface logic 710 and reporting logic 720.

Although not shown, it is contemplated that the service monitoring service 630 of FIG. 6A and/or the cloud broker 610 communicatively coupled to the service monitoring service 630 may aggregate operational metadata for all clusters and compute nodes for use by the first enforcement logic 143 to confirm subscription requirements are satisfied for all customers. Where any subscription requirements are not satisfied, the malware detection system may be augmented with additional clusters, compute nodes or reconfigured to optimize operability of the clusters or computer nodes or provide new functionality (e.g., new guest images supported, etc.). More specifically, by evaluating the operational metadata provided by the cluster management system for all clusters against subscription information from the subscription review service regarding all customer registrations (and/or sensor enrollments for object evaluation services), the first enforcement logic 143 of the cloud broker 610 may generate system status information indicating the overall capacity and capability of the malware detection system to service all the registered customers per their aggregated service level requirements. The system monitoring service provides the system status information to system administrators by generating and sending status reports and alerts on demand and/or as system conditions require.

Herein, the proxy module(s) $700_1$-$700_R$ include one or more software modules that, when executed by a hardware processor (not shown), collectively operate as a proxy server, which conducts load balancing of communications from the sensors $110_1$-$110_M$ as governed by the policy and routing rules 730 of the rules engine 142. The load balancing is based, at least in part, on the cluster selection values 157 that are produced by the system monitoring logic 630 from the collected operational metadata 150, where the operational metadata 150 may be stored in a data store (not shown) accessible to the first enforcement logic 143. These cluster selection values 157 are made available to the proxy module(s) $700_1$-$700_R$ via interface logic 710, which provides a mechanism to propagate load-balancing updates to the proxy module $700_1$-$700_R$. Configured to select a cluster (and in one embodiment a particular broker compute node), the proxy module(s) $700_1$-$700_R$ may use the cluster selection values 157 as input parameters for the rule engine 142 which, based on the policy and routing rules 730, results in the selection of a particular cluster (e.g., cluster $185_1$) from the set of clusters $185_1$-$185_N$ available to a requesting sensor (e.g., sensor $110_1$).

According to another embodiment of the disclosure, besides the cluster selection values 157 described above, a portion of the subscription information 177 (stored within the data store(s) 175 and accessible by content in the analysis request message 125 from the sensor $110_1$) may be analyzed by at least one of the proxy modules (e.g., proxy module $700_R$) in determining a selected cluster (e.g., cluster $185_1$).

For instance, as an illustrative example, the Sensor_ID included as part of the analysis request message 125 may be provided to at least one of the proxy modules (e.g., proxy module $700_R$), where the Sensor_ID may identify a geographic region of the sensor $110_1$ and the Sensor_ID may be used to retrieve certain attributes of the subscription information 177 from the data store 175 located within the first subsystem 130 and/or the second subsystem 160 (e.g., a data store within the subscription review service 170). Additionally, or in the alternative, the Customer_ID may be included as part of the analysis request message 125 for use in accessing certain attributes of the subscription information 177 maintained within the cloud broker 610 or stored remotely from the cloud broker 610 and within the malware detection system 100 (e.g., within the first subsystem 130 or the second subsystem 160).

Depending on such information, the proxy module $700_R$ may utilize (i) the cluster selection values 157 accessible from the system monitoring logic 630, (ii) the Sensor_ID, the Customer_ID, and/or its associated subscription information 177 as other inputs for the policy and routing rules 730 executed by the rules engine 142 in determining what cluster (and/or broker compute node) to select for communications with the sensor $110_1$. This determination may involve emphasizing (e.g., increase value to, apply weights on, etc.) the cluster selection value(s) 157 associated with a cluster (or compute node) within a certain geographic proximity to the sensor than clusters outside this geographic region. Another determination may involve evaluating whether the selected cluster (or targeted broker compute node) can satisfy (or is satisfying) QoS thresholds for this subscription. A high QoS threshold may provide the sensor $110_1$ with a lower number of possible clusters than a low QoS threshold.

The reporting logic 720 of the cloud broker 610 gathers operational metadata and/or analysis results from the proxy module(s) $700_1$-$700_R$. These operational metadata and/or analysis results may be aggregated to formulate statistical information as described above, which is searchable and available for display and analysis by a subscriber management system within the subscriber site 112.

In the foregoing description, the invention is described with reference to specific exemplary embodiments thereof. However, it will be evident that various modifications and changes may be made thereto without departing from the broader spirit and scope of the invention as set forth in the appended claims. Principles of the invention may be practiced within a single monolithic malware detection system with a single cluster and/or a single compute node within the cluster.

What is claimed is:

1. A system, comprising:
    a cloud-based malware detection system including at least a processor and a memory, the memory includes object analysis logic that, during execution by the processor, analyzes an object to determine whether the object is associated with a cyber-attack;
    a portal that provides access over a network to displayable data for a customer to register with and obtain a subscription to the cloud-based malware detection system; and
    a subscription review service communicatively coupled with the portal, the subscription review service comprises a data store storing subscription information, wherein the subscription information includes an identifier for the customer and one or more identifiers each associated with a corresponding customer submitter being logic operable to submit an object to the cloud-based malware detection system for analysis, wherein the cloud-based malware detection system further comprises a cloud broker to perform one or more inter-cluster analyses to select a cluster to conduct a malware analysis of the object from a plurality of clusters based, at least in part, on the subscription information and operational metadata associated with operations of the plurality of clusters, and a cluster broker communicatively coupled with and remotely located from the cloud broker and deployed within the selected cluster, the cluster broker to perform one or more intra-cluster analyses for causing an object analyzer of the selected cluster to analyze the object to determine whether the analyzed object is associated with a cyber-attack.

2. The system of claim 1 further comprising:
a first customer submitter to receive credentials associated with the subscription provided by the subscription review service to establish communications with the cloud-based malware detection system.

3. The system of claim 2, wherein the first customer submitter being communicatively coupled to a subscriber management system, the subscriber management system to (i) monitor objects including the object being submitted by the first customer submitter for analysis to the cloud-based malware detection system and (ii) enforce compliance with a plurality of requirements of the subscription to the cloud-based malware detection service based on operations performed by at least the first customer submitter.

4. The system of claim 3, wherein the subscriber management system includes enforcement logic to enforce compliance with the plurality of requirements of the subscription by at least monitoring the operations of the first customer submitter, comparing the operations of the first customer submitter to one or more attributes of the subscription, and altering operations of the first customer submitter in response to detecting that the operations of the first customer submitter exceed limits imposed by the one or more attributes.

5. The system of claim 3, wherein the subscriber management system includes enforcement logic that (i) collects and aggregates metadata associated with data submissions to the cloud-based malware detection system from a plurality of customer submitters including the first customer submitter associated with the customer and controlled by the subscriber management system, (ii) receives a portion of the subscription information including one or more service attributes establishing a service performance level for the subscription, (iii) analyzes whether the aggregated metadata associated with the data submissions to the cloud-based malware detection system complies with the service performance level established by the one or more service attributes associated with the subscription, and (iv) responsive to detecting that the customer failing to comply with the service performance level, performs an operation to address a failure by the customer in complying with the service performance level associated with the subscription.

6. The system of claim 5, wherein the analyzing whether the aggregated metadata complies with the service performance level by the enforcement logic comprises determining whether the aggregated metadata indicates that the customer has exceeded a predetermined number or rate of data submissions set for the customer to the cloud-based malware detection system.

7. The system of claim 6, wherein the performing, by the subscriber management system, of the operation to address the failure by the customer to comply with the service performance level associated with the subscription comprises notifying an administrator for the customer via an alert message issued by the enforcement logic of the subscriber management system to alter the subscription to increase the predetermined number or rate of data submissions for the customer to support a number of data submissions being provided by the customer to the cloud-based malware detection system.

8. The system of claim 6, wherein the performing, by the subscriber management system, of the operation to address the failure by the customer to comply with the service performance level associated with the subscription comprises altering operations of at least the first customer submitter to reduce a number or rate of data submissions transmitted to the cloud-based malware detection system, the first customer submitter includes a sensor to (i) capture network traffic and (ii) perform a preliminary analysis on the network traffic to determine whether at least the object is suspicious by (a) comparing content of the object to content associated with known malware to produce a result, and (b) comparing the result to an attack threshold being a minimum percentage of content shared with known malware.

9. The system of claim 8, wherein the altering of the operations by at least the first customer submitter to reduce the number or rate of data submissions transmitted to the cloud-based malware detection system comprises increasing an attack threshold identifying that the objects extracted from the network traffic are potentially associated with a cyber-attack thereby reducing the number of suspicious objects provided by the first customer submitter to the cloud-based malware detection system.

10. The system of claim 3, wherein the subscriber management system being configured to receive statistical information based on the metadata from the cloud-based malware detection system, and after receipt of the statistical information, the subscriber management system changing the subscription via the portal.

11. The system of claim 3, wherein the subscriber management system includes enforcement logic to enforce compliance with the plurality of requirements of the subscription by at least monitoring the operations of the first customer submitter, comparing the operations of the first customer submitter to one or more attributes of the subscription that are associated with operations of a submitter, and altering operations of the first customer submitter in response to detecting that the operations of the first customer submitter exceed limits imposed by the one or more attributes.

12. The system of claim 2, wherein the first customer submitter includes a sensor to capture network traffic, perform a preliminary analysis on the network traffic to identify suspicious traffic, and provide objects extracted from the suspicious traffic to the cloud-based malware detection system for further analysis to determine whether the objects are associated with a cyber-attack, the sensor includes analysis logic operable in a network device communicatively coupled to the cloud-based malware detection system and the subscription review service.

13. The system of claim 12, wherein the network traffic is identified as suspicious upon at least a portion of the network traffic meets or exceeds an attack threshold identifying that the objects extracted from the network traffic are potentially associated with a cyber-attack, and an operability of the first customer submitter is changed to reduce a number of objects provided to cloud-based malware detection system by increasing the attack threshold.

14. The system of claim 12, wherein the sensor is a virtual sensor operable on a second processor different than the processor of the cloud-based malware detection system and stored within a second memory different than the memory of the cloud-based malware detection system.

15. The system of claim 1, wherein the cloud-based malware detection system further comprises:
enforcement logic that, during execution by the processor, enforces compliance with a plurality of requirements of the subscription to the cloud-based malware detection system; and
reporting logic that, during execution by the processor, transmits a result of the analysis of the object by the cloud-based malware detection system in determining whether the object is associated with a cyber-attack.

16. The system of claim 15, wherein the enforcement logic, during execution by the processor, enforces (i) compliance by the customer being expected to operate in accordance with the plurality of requirements of the subscription as selected by the customer and (ii) compliance by a second customer being expected to operate in accordance with a second plurality of requirements of a subscription as selected by the second customer.

17. The system of claim 15, wherein the enforcement logic of the cloud-based malware detection system to enforce compliance with the plurality of requirements of the subscription by at least (i) analyzing whether metadata associated with operations performed on data submitted by the first customer submitter to the cloud-based malware detection complies with a service performance level established by one or more service attributes associated with the subscription that are stored as a portion of the subscription information, and (ii) responsive to detecting the first customer submitter failing to comply with the service performance level, performing an operation to address a failure.

18. The system of claim 17, wherein the analyzing whether the metadata complies with the service performance level by the enforcement logic comprises determining whether the metadata associated with operations performed on the data submitted to the cloud-based malware detection system by the first customer submitter indicates that the data is being submitted by a plurality of customer submitters, including the first customer submitter, is analyzed by a cluster residing within a geographic location as set by a service attribute of the one or more service attributes of the subscription.

19. The system of claim 18, wherein the performing of the operation to address the failure by the customer to comply with the service performance level associated with the subscription by the enforcement logic comprises transmitting an alert to a system administrator of the cloud-based malware detection system, the alert identifying non- compliance with the service attribute to prompt an addition of a cluster or compute nodes operating with the geographic location to comply with the service attribute.

20. The system of claim 15, wherein the enforcement logic of the cloud-based malware detection system to enforce compliance with the plurality of requirements of the subscription by at least (i) analyzing whether metadata associated with operations performed on data submitted by the customer to the cloud-based malware detection complies with a service performance level established by one or more service attributes associated with the subscription that are stored as a portion of the subscription information, and (ii) responsive to detecting the customer failing to comply with the service performance level, performing an operation to address a failure.

21. The system of claim 20, wherein the analyzing whether the metadata complies with the service performance level by the enforcement logic comprises determining whether the metadata associated with operations performed on the data submitted to the cloud-based malware detection system by the customer indicates that a first number or first rate of data submissions to the cloud-based malware detection system provided by the customer exceeds a corresponding second number or second rate of data submissions set for the subscription.

22. The system of claim 21, wherein the performing of the operation to address the failure comprises transmitting an alert to an administrator for the customer by the enforcement logic of the cloud-based malware detection system, the alert providing suggested measures for altering the subscription to permit an increase in the second number or second rate of data submissions by the customer to comply with a maximum number or rate of data submissions set for the subscription .

23. The system of claim 21, wherein the performing of the operation to address the failure by the customer to comply with the service performance level associated with the subscription comprises forcing a re-enrollment of at least the first customer submitter by changing data submissions transmitted to a first cluster of a plurality of clusters of the cloud-based malware system to a second cluster that is different than the first cluster.

24. The system of claim 20, wherein the analyzing whether the metadata complies with the service performance level comprises determining whether the metadata associated with operations performed on the data submitted to the cloud-based malware detection system by the customer indicates that the data being submitted by a plurality of customer submitters is greater than a predetermined number of customer submitters authorized by the subscription to communicate with the cloud-based malware detection system.

25. The system of claim 24, wherein the performing of the operation to address the failure by the customer to comply with the service performance level associated with the subscription by the enforcement logic comprises transmitting an alert to an administrator for the customer by the enforcement logic of the cloud-based malware detection system, the alert providing suggested measures for altering the subscription to increase the predetermined number of customer submitters authorized to communicate with the cloud-based malware detection system.

26. The system of claim 1, wherein the object analyzer comprises at least one virtual machine to monitor behaviors resulting from processing of the object, and correlation logic to determine whether the monitored behaviors correlate to behaviors corresponding to a cyber-attack.

27. The system of claim 1, wherein the cluster comprises a cluster management system communicatively coupled with the cluster broker to enforce the plurality of requirements of the subscription to the cloud-based malware detection system.

28. The system of claim 1, wherein the portal being accessible over a public network by a plurality of customers including the customer, and the data store of the subscription review service to store subscription information for each of the plurality of customers.

29. A computerized method for enforcing compliance with a plurality of requirements of a subscription to a malware detection system, the method comprising:
  receiving, by enforcement logic, operational metadata from the malware detection system, the operational metadata being metadata associated with operations performed on one or more objects submitted by a customer in determining whether any object of the one or more objects is associated with a cyber-attack;
  determining, by the enforcement logic, whether an interaction between the customer_and the malware detection system is in compliance with the plurality of requirements of the subscription to the malware detection system by at least
    analyzing whether the operational metadata associated with operations performed on the one or more objects, submitted by the customer to the malware detection system to determine whether the one or more objects are associated with a cyber-attack, complies with a service performance level that is set by one or more service attributes associated with the subscription stored in memory and accessible by the enforcement logic by at least determining whether a predetermined number or rate of data submissions has been exceeded, and
    responsive to detecting a non-compliance, performing an operation to address the non-compliance.

30. The method of claim 29, wherein the analyzing whether the operational metadata complies with the operations performed on the one or more objects is based, at least in part, on determining whether quality-of-service (QoS) attributes guaranteed for a selected subscription tier has not been met.

31. The method of claim 29, wherein the performing of the operation to address the non-compliance by the customer to comply with the service performance level associated with the subscription comprises transmitting an alert to an administrator for the customer by the enforcement logic of the malware detection system, the alert providing suggested measures for altering the subscription to permit an increase in the predetermined number or rate of data submissions provided by the customer to comply with a corresponding maximum number or rate of data submissions set for the subscription.

32. The method of claim 29, wherein the analyzing whether the operational metadata complies with the service performance level comprises determining whether the operational metadata associated with operations performed on the data submitted to the malware detection system by the customer indicates that the data being submitted by a plurality of customer submitters is greater than at least one of (a) a predetermined number of customer submitters authorized by the subscription to communicate with the malware detection system, and (b) a maximum number or rate of data submissions set by the service performance level associated with the subscription of the customer.

33. The method of claim 32, wherein the performing of the operation to address the non-compliance by the customer to comply with the service performance level associated with the subscription comprises transmitting an alert to an administrator for the customer by the enforcement logic of the malware detection system, the alert providing suggested measures for altering the subscription to increase the predetermined number of customer submitters authorized to communicate with the malware detection system or the maximum number or rate set by the service performance level associated with the subscription of the customer.

34. The method of claim 29, wherein the analyzing whether the operational metadata complies with the service performance level comprises determining whether the operational metadata associated with operations performed on the data submitted to the malware detection system by the customer indicates that the data is being submitted by a plurality of customer submitters and is analyzed by the malware detection system residing within a geographic location as set by a service attribute of the one or more service attributes of the subscription.

35. The method of claim 34, wherein the performing of the operation to address the failure by the customer to comply with the service performance level associated with the subscription comprises transmitting an alert to a system administrator of the malware detection system, the alert identifying non-compliance with the service attribute to prompt an addition of a cluster or compute node operating with the geographic location to comply with the service attribute.

36. The method of claim 35, wherein the performing of the operation to address the non-compliance by the customer to comply with the service performance level associated with the subscription comprises altering operations of at least a first customer submitter of the plurality of customer submitters to reduce a number or rate of data submissions transmitted to the malware detection system, the first customer submitter includes a sensor to (i) capture network traffic and (ii) perform a preliminary analysis on the network traffic to determine whether at least the object is suspicious by (a) comparing content of the object to content associated with known malware to produce a result, and (b) comparing the result to an attack threshold being a minimum percentage of content shared with known malware.

37. The method of claim 36, wherein the altering of the operations by at least the first customer submitter to reduce the number of data submissions transmitted to the malware detection system comprises increasing the attack threshold that reduces the number of suspicious objects provided by the first customer submitter to the malware detection system.

38. The method of claim 29, wherein the subscriber management system includes enforcement logic that (i) collects and aggregates metadata associated with data submissions to the malware detection system from a plurality of customer submitters associated with the customer and controlled by the subscriber management system, (ii) receives a portion of the subscription information including one or more service attributes establishing a service performance level for the subscription, and (iii) analyzes whether the aggregated metadata associated with the data submissions to malware detection system complies with the service performance level established by the one or more service attributes associated with the subscription, and (iv) responsive to detecting that the customer failing to comply with the service performance level, performing an operation to address a failure by the customer in complying with the service performance level associated with the subscription.

39. The method of claim 29, wherein the performing of the operation to address the failure by the customer to comply with the service performance level associated with the subscription comprises notifying an administrator for the customer via an alert message issued by the subscriber management system to alter the subscription to increase the predetermined maximum rate of data submissions for the customer to support a rate of data submissions being provided by the customer to the malware detection system.

40. The method of claim 29 further comprising:
monitoring, by a subscription management system, the one or more objects being submitted by a first customer submitter for analysis to the malware detection system and enforce compliance with the plurality of requirements of the subscription to the malware detection system on operations performed by at least the first customer submitter.

41. A system, comprising:
a cloud-based malware detection system including at least a processor and a memory, the memory includes object analysis logic that, during execution by the processor, analyzes each of one or more objects to determine whether the object is associated with a cyber-attack;
a portal that provides access over a network to displayable data for a customer to register with and obtain a subscription to the malware detection system;
a subscription review service communicatively coupled with the portal, the subscription review service comprises a data store storing subscription information, wherein the subscription information includes an identifier for the customer and one or more identifiers each associated with a corresponding customer submitter operable to submit an object to the malware detection system for analysis; and
enforcement logic to receive operational metadata from the malware detection system, the operational metadata being metadata associated with operations performed on the one or more objects submitted by a customer in determining whether any object of the one or more objects is associated with a cyber-attack,
wherein the enforcement logic to determine whether an interaction between the customer and the malware detection system is in compliance with the plurality of requirements of the subscription to the malware detection system by at least
analyzing whether the operational metadata associated with operations performed on the one or more objects, submitted by the customer to the malware detection system, to determine whether the one or more objects are associated with a cyber-attack, complies with a service performance level that is set by one or more service attributes associated with the subscription stored in memory and accessible by the enforcement logic by at least determining whether a predetermined number or rate of data submissions has been exceeded, and
responsive to detecting that the customer is failing to comply with the service performance level, performing an operation to address a failure by the customer to comply with the service performance level associated with the subscription.

42. The system of claim 41, wherein the enforcement logic analyzing whether the operational metadata complies with the service performance level by at least determining whether the operational metadata indicates that a first number or a first rate of data submissions to the system provided by the customer exceeds a corresponding second number or a second rate of data submissions set for the subscription.

43. The system of claim 41, wherein the performing of the operation to address the failure comprises transmitting an alert to an administrator for the customer by the enforcement logic, the alert providing suggested measures for altering the subscription to permit an increase in the second number or the second rate of data submissions by the customer to comply with a maximum number or a maximum rate of data submissions set for the subscription.

44. The system of claim 41, wherein the performing of the operation to address the failure comprises forcing a re-enrollment of at least a first customer submitter of the customer by changing data submissions transmitted to a first cluster of a plurality of clusters of the malware system to a second cluster that is different than the first cluster.

45. The system of claim 41, wherein the analyzing whether the metadata complies with the service performance level comprises determining whether the operational metadata by the customer indicates that the data being submitted by a plurality of customer submitters of the customer is greater than a predetermined number of customer submitters authorized by the subscription to communicate with the system.

* * * * *